United States Patent [19]
Mohda et al.

[11] Patent Number: 6,100,901
[45] Date of Patent: Aug. 8, 2000

[54] METHOD AND APPARATUS FOR CLUSTER EXPLORATION AND VISUALIZATION

[75] Inventors: Dharmendra Shantilal Mohda; David Charles Martin, both of San Jose; William Scott Spangler, San Martin; Shivakumar Vaithyanathan, San Jose, all of Calif.

[73] Assignee: International Business Machines Corporation, Armonk, N.Y.

[21] Appl. No.: 09/102,087

[22] Filed: Jun. 22, 1998

[51] Int. Cl.[7] .................................................. G06T 11/20
[52] U.S. Cl. ............................................................ 345/440
[58] Field of Search .................................. 345/440, 427; 707/6

[56] References Cited

U.S. PATENT DOCUMENTS

| | | | |
|---|---|---|---|
| 5,450,535 | 9/1995 | North | 395/140 |
| 5,625,767 | 4/1997 | Bartell et al. | 395/140 |
| 5,832,182 | 11/1998 | Zhang et al. | 395/10 |
| 5,983,224 | 11/1999 | Singh et al. | 707/6 |

OTHER PUBLICATIONS

Lee et al., "Modified K–means Algorithm for Vector Quantizer Design", IEEE Signal Processing Letters, vol. 4, No. 1, pp. 2–4, Jan. 1997.

Su et al, "Application of Neural Networks in Cluster Analysis", IEEE, pp. 1–5, Jan. 1997.

D. Keim, Enhancing the Visual Clustering of Query–Dependent Database Visualization Techniques Using Screen-–Filling Curves, Institute for Computer Science, University of Munich, Leopoldstr. 11B, D–80802, Munich, Germany.

G. Grinstein et al., Visualizing Multidimensional (Multivariate) Data and Relations, Proceedings of the IEEE Conference on Visualization 1994, Washington, D.C., pp. 404–411.

M. Ester et al., Spatial Data Mining: A Database Approach, Advances in Spatial Databases, M. Scholl et al. Editors, 5th International Symposium, SSD'97 Berlin, Germany, Jul. 15–18, 1997 Proceedings, pp. 46–66.

D.P. Huttenlocher et al., Comparing Point Sets Under Projection, Proceedings of the Fifth Annual ACM–SIAM Symposium On Discrete Algorithms, Arlington, Virginia, Jan. 23–25, 1994; pp. 1–7.

S.Z. Selim et al., K–Means–Type Algorithms: A Generalized Convergence Theorem and Characterization of Local Optimality, IEEE Transactions on Pattern Analysis and Machine Intelligence, vol. PAMI–6, No. 1, Jan. 1984, pp. 81–87.

J. H. Friedman et al., A Projection Pursuit Algorithm for Exploratory Data Analysis, IEEE Transactions On Computers, vol. c–23, No. 9, Sep. 1974, pp. 881–810.

(List continued on next page.)

Primary Examiner—Mark R. Powell
Assistant Examiner—Motilewa Good-Johnson
Attorney, Agent, or Firm—Khank Q. Tran; Banner & Witcoff, Ltd.

[57] ABSTRACT

A method and apparatus for visualizing a multi-dimensional data set in which the multi-dimensional data set is clustered into k clusters, with each cluster having a centroid. Then, either two distinct current centroids or three distinct non-collinear current centroids are selected. A current 2-dimensional cluster projection is generated based on the selected current centroids. In the case when two distinct current centroids are selected, two distinct target centroids are selected, with at least one of the two target centroids being different from the two current centroids. In the case when three distinct current centroids are selected, three distinct non-collinear target centroids are selected, with at least one of the three target centroids being different from the three current centroids. An intermediate 2-dimensional cluster projection is generated based on a set of interpolated centroids, with each interpolated centroid corresponding to a current centroid and to a target centroid associated with the current centroid. Each interpolated centroid is interpolated between the corresponding current centroid and the target centroid associated with the current centroid. Alternatively, the intermediate 2-dimensional cluster projection is generated based on an interpolated 2-dimensional nonlinear cluster projection that is based on the selected current centroids and the selected target centroids.

40 Claims, 14 Drawing Sheets

OTHER PUBLICATIONS

H. Ralambondrainy, A Conceptual Version of the K–Means Algorithm. Pattern Recognition Letters 16 (1995) pp. 1147–1157.

S. Vaithyanathan et al., A Multiple PCA (MPCA) Model for Hierarchical Decomposition Of Large Document Collections, IBM Research Report, RJ 10082 (91898) Jul. 25, 1997, Computer Science, pp. 1–13.

D. Swayne et al., Exploratory Data Analysis Using Interactive Dynamic Graphics, Third International Conference on Knowledge Discovery & Data Mining, Newport Beach, California, Aug. 14, 1997, pp. T4–1, T4–4–T4–32.

A. Buja et al., Theory and Computational Methods for Dynamic Projections in High–Dimensional Data Visualization, Journal of Computational and Graphical Statistics, 1997, pp. 1–67.

G.T. Toussaint, The Relative Neighbourhood Graph Of A Finite Planar Set, Pattern Recognition, vol. 12, pp. 261–268, received Sept. 21 1979.

M. Ichino, The Relative Neighborhood Graph For Mixed Feature Variables, Pattern Recognition, vol. 18, No. 2, pp. 161–167, 1985.

G.W. Furnas et al., Prosection Views: Dimensional Inference Through Sections and Projections, Journal of Computational and Graphical Statistics, pp. 1–26, Dec. 1, 1993.

A. Buja et al., Grand Tour Methods: An Outline, Elsevier Science Publishers B.V. (North–Holland), pp. 63–67, 1986.

D. Pollard, A Central Limit Theorem for k–Means Clustering, The Annals of Probability, vol. 10, No. 4, 919–926, 1982.

D. Pollard, Quantization and the Method of k–Means, IEEE Transactions on Information Theory, vol. IT–28, No. 2, pp. 199–205, Mar. 1982.

C. Hurley et al., Analyzing High–Dimensional Data With Motion Graphics, SIAM Journal of Science Stat. Computer, vol. 11, No. 6, pp. 1193–1211, Nov 1990.

D. Asimov, The Grand Tour: A Tool For viewing Multidimensional Data, SIAM Journal of Science Stat. Computer, vol. 6, No.1, pp. 128–143, Jan. 1985.

Duda et al., Unsupervised Learning And Clustering, Pattern classification and Scene Analysis, New York, Wiley, pp. 210–257, 1973.

B. Ripley, Pattern Recognition and Netural Networks, Cambridge University Press, pp. 311–322, 1996.

METHOD AND APPARATUS FOR CLUSTER EXPLORATION AND VISUALIZATION

BACKGROUND OF THE INVENTION

1. Field of the Invention

The present invention relates to the field of computing. More particularly, the present invention relates to a method and an apparatus for performing dynamic exploratory visual data analysis.

2. Description of the Related Art

Clustering, the grouping together of similar data points in a data set, is a widely used procedure for statistically analyzing data. Practical applications of clustering include unsupervised classification and taxonomy generation, nearest-neighbor searching, scientific discovery, vector quantization, text analysis and navigation, data reduction and summarization, supermarket database analysis, customer/market segmentation, and time series analysis.

One of the more popular techniques for clustering data in a data set is by using the k-means algorithm which generates a minimum variance grouping of data by minimizing the sum of squared Euclidean distances from cluster centroids. The popularity of the k-means algorithm is based on its ease of interpretation, simplicity of implementation, scalability, speed of convergence, parallelizability, adaptability to sparse data, and ease of out-of-core implementation. Variations of the k-means algorithm exist for numerical, categorical and mixed attributes. Variations of the k-means algorithm also exist for similarity measures other than a Euclidean distance.

Statistical and computational issues associated with the k-means algorithm have received considerable attention. The same cannot be said, however, for another key ingredient for multidimensional data analysis: visualization, or the exploratory data analysis based on dynamic computer graphics.

Conventional exploratory data analysis techniques use unsupervised dimensionality reduction methods for processing multidimensional data sets. Examples of popular conventional unsupervised dimensionality reduction methods used for projecting high-dimensional data to fewer dimensions for visualization include truncated singular value decomposition, projection pursuit, Sammon mapping, multi-dimensional scaling and a nonlinear projection method based on Kohonen's topology preserving maps.

Truncated singular value decomposition is a global, linear projection methodology that is closely related to principal component analysis (PCA). Projection pursuit combines both global and local properties of multi-dimensional data sets to find useful and interesting projections. For example, see J. Friedman et al., A projection pursuit algorithm for exploratory data analysis, IEEE Transactions on Computers, C-23, pp. 881–890, 1994; P. Huber, Projection pursuit (with discussion), Annals of Statistics, 13, pp. 435–525, 1985; and D. Cook et al., Grand tour and projection pursuit, Journal of Computational and Graphical Statistics, 4(3), pp. 155–172, 1995.

Sammon mapping and multi-dimensional scaling are each nonlinear projection methods used for projecting multi-dimensional data to fewer dimensions. For details regarding Sammon mapping, see, J. W. Sammon, A nonlinear mapping algorithm for data struction analysis, IEEE Transactions on Computers, Vol. 18, pp. 491–509, 1969. For details regarding multi-dimensional scaling, see J. B. Kruskal, Nonmetric multidimensional scaling: A numerical method, Psychometrika, Vol. 29. pp. 115–129, 1964, and J. B. Kruskal, Multidimensional scaling and other method for discovering structure, Statistical Methods for Digital Computers, K. Enslein et al. editors, Wiley, pp 296–339, 1977.

The basic idea for Sammon mapping and multi-dimensional scaling is to minimize the mean-squared difference between interpoint distances in the original space and interpoint distances in the projected space. The nonlinear mappings produced by Sammon's method and multi-dimensional scaling are difficult to interpret and are generally computationally expensive.

A recently proposed a nonlinear projection method for visualizing high-dimensional data as a two-dimensional image uses Kohonen's topology preserving maps. See, for example, M. A. Kraaijveld et al., A nonlinear projection method based on Kohonen's topology preserving maps, IEEE Transactions on Neural Networks, Vol 6(3), pp. 548–559, 1995. For background regarding Kohonen's topology preserving maps, see T. Kohonen, Self Organization and Associative Memory, Springer-Verlag, 1989. This approach generates only a 2-dimensional projection and not a set of projections, so it does not appear possible to construct guided tours based on this approach method.

What is needed is a way to visualize a multi-dimensional data set in relation to clusters that have been produced by the k-means algorithm. What is also needed is a way to visually understand the proximity relationship between the cluster centroids of a data set.

SUMMARY OF THE INVENTION

The present invention provides a way to visualize a multi-dimensional data set in relation to clusters that have been produced by the k-means algorithm and a way to visually understand the proximity relationship between the cluster centroids of the data set.

The advantages of the present invention are provided by a method for visualizing a multi-dimensional data set in which the multi-dimensional data set is clustered into k clusters, with each cluster having a centroid. Then, either two distinct current centroids or three distinct non-collinear current centroids are selected. A current 2-dimensional cluster projection is generated based on the selected current centroids. In the case when two distinct current centroids are selected, two distinct target centroids are selected, with at least one of the two target centroids being different from the two current centroids. In the case when three distinct current centroids are selected, three distinct non-collinear target centroids are selected, with at least one of the three target centroids being different from the three current centroids.

According to one aspect of the invention, each current centroid is associated with a target centroid, and an intermediate 2-dimensional cluster projection is repeatedly generated based on a set of interpolated centroids, with each interpolated centroid corresponding to a current centroid and to the target centroid associated with the current centroid. When the intermediate 2-dimensional cluster projection is repeatedly generated, each interpolated centroid is interpolated between the corresponding current centroid and the associated target centroid based on a value of an interpolation parameter that is preferably monotonically increased, thereby generating a holistic image of the multi-dimensional data set with respect to the current centroids and the target centroids.

To generate a visual tour of the data set based on interpolated centroids, the selected target centroids are redefined to be new current centroids. In the case when two new current centroids are defined from the selected target centroids, two distinct new target centroids are selected such that at least one of the two distinct new target centroids is different from the two new current centroids. In the case when three distinct non-collinear new current centroids are defined from the selected target centroids, three distinct non-collinear new target centroids are selected such that at least one of the three distinct non-collinear new target centroids is different from the three distinct non-collinear new current centroids. Each new current centroid is associated with a new target centroid, and an intermediate 2-dimensional cluster projection is generated based on a set of new interpolated centroids. As before, each interpolated centroid of the new set of interpolated centroids corresponds to a new current centroid and to the associated new target centroid, and each new interpolated centroid is interpolated between the corresponding new current centroid and the associated new target centroid.

The steps of defining new current centroids, selecting new target centroids, associating each new current centroid with a new target centroid, and generating the intermediate 2-dimensional cluster projection are performed repeatedly, thereby generating the visual tour and providing a holistic image of the multi-dimensional data set with respect to each set of current centroids and the target centroids associated with a set of current centroids.

An average least-squares reconstruction error is calculated for at least one 2-dimensional cluster projection. Likewise, an average least-squares reconstruction error is calculated based on a truncated singular value decomposition of the data set. Each calculated average least-square reconstruction error is then compared to the calculated average least-square construction error and displayed.

According to another aspect of the invention, the step of generating the intermediate 2-dimensional cluster projection generates an interpolated 2-dimensional cluster projection based on the selected current centroids, the selected target centroids and an interpolation parameter. The intermediate 2-dimensional cluster projection is repeatedly generated based on different values of the interpolation parameter. Preferably, the value of the interpolation parameter is monotonically increased, thereby generating a holistic image of the multi-dimensional data set with respect to the current centroids and the target centroids that follows, for example, a geodesic path between the current centroids and the target centroids associated with the current centroids.

To generate a visual tour of the data set for interpolated 2-dimensional cluster projections, the selected target centroids are redefined to be new current centroids. In the case when two new current centroids are defined from the selected target centroids, two distinct new target centroids are selected such that at least one of the two distinct new target centroids is different from the two new current centroids. In the case when three distinct non-collinear new current centroids are defined from the selected target centroids, three distinct non-collinear new target centroids are selected such that at least one of the three distinct non-collinear new target centroids is different from the three distinct non-collinear new current centroids. An intermediate 2-dimensional cluster projection is generated based on a set of new current and target centroids.

For this aspect of the invention, the steps of defining new current centroids, selecting new target centroids, and generating the intermediate 2-dimensional cluster projection are performed repeatedly, thereby generating the visual tour and providing a holistic image of the multi-dimensional data set with respect to each set of current centroids and the target centroids.

BRIEF DESCRIPTION OF THE DRAWING

The present invention is illustrated by way of example and is not limited as illustrated in the accompanying figures in which like reference numerals indicate similar elements and in which.

DETAILED DESCRIPTION

The present invention provides a way to visualize a multi-dimensional data set in relation to clusters that have been produced by the k-means algorithm. The present invention also provides a way to visually understand the proximity relationship between the cluster centroids of the data set.

To illustrate the present invention, consider a set of n data points $\{X_i\}_{i=1}^n$ each taking values in a p-dimensional Euclidean space $R^p$, with $p \geq 3$. Let $X=(X_1, \ldots, X_p)$ and $Y=(Y_1, \ldots, Y_p)$ denote two points in $R^p$. The dot product of X and Y is denoted as $$X \circ Y = \sum_{u=1}^{p} X_u Y_u. \tag{1}$$

The Euclidean norm of X is $$\|X\| = \sqrt{X \cdot X}. \quad (2)$$

The Euclidean distance between X and Y is $$d_2(X, Y) = \|X - Y\|. \quad (3)$$

Assume that the data set has been partitioned into k clusters using the k-means algorithm, and let $\{C_j\}_{j=1}^k$ denote the respective centroids of the clusters. Each centroid is simply an average of all the data points contained in a cluster.

A 2-dimensional linear cluster projection can be obtained by projecting the data set $\{X_i\}_{i=1}^n$ onto the unique two-plane in $R^p$ determined for any three distinct and non-collinear cluster centroids $C_a$, $C_b$ and $C_c$ in $\{C_j\}_{j=1}^k$. Mathematically, the two-plane form by $C_a$, $C_b$ and $C_c$ is simply the linear subspace $$L(C_a, C_b, C_c) = \text{span}(C_b - C_a, C_c - C_a) \subset R^p. \quad (4)$$

Let $K_1$ and $K_2$ constitute an orthonormal basis of $L(C_a, C_b, C_c)$. A 2-dimensional linear cluster projection can be computed by projecting the data set $\{X_i\}_{i=1}^n$ onto the orthonormal basis $\{K_1, K_2\}$. Given k cluster centroids, there are at most $\binom{k}{3}$ unique 2-dimensional linear cluster projections. Each linear cluster projection allows the multidimensional data set to be visualized in relation to a triplet of cluster centroids.

An exemplary algorithm for computing a 2-dimensional linear cluster projection is given by the following pseudocode:

```
proc LinearProjec (n,{X_i}^n_{i=1}, K_1, K_2) ≡
    x: = 1; y: = 1;
    for i: = 1 to n step 1 do
        V_i(x): = X_i ○ k_1; V_i(y): = X_i ○ K_2
    od;
    return ({V_i}^n_{i=1});
end
```

Two-dimensional linear cluster projections of data set $\{X_i\}_{i=1}^n$ are a continuous transformation of the data. Consequently, two points that are close in $R^p$ will remain close in the linear subspace $L(C_a, C_b, C_c)$. Two points that are close in $L(C_a, C_b, C_c)$, however, may not necessarily be close in $R^p$.

Figure 1:
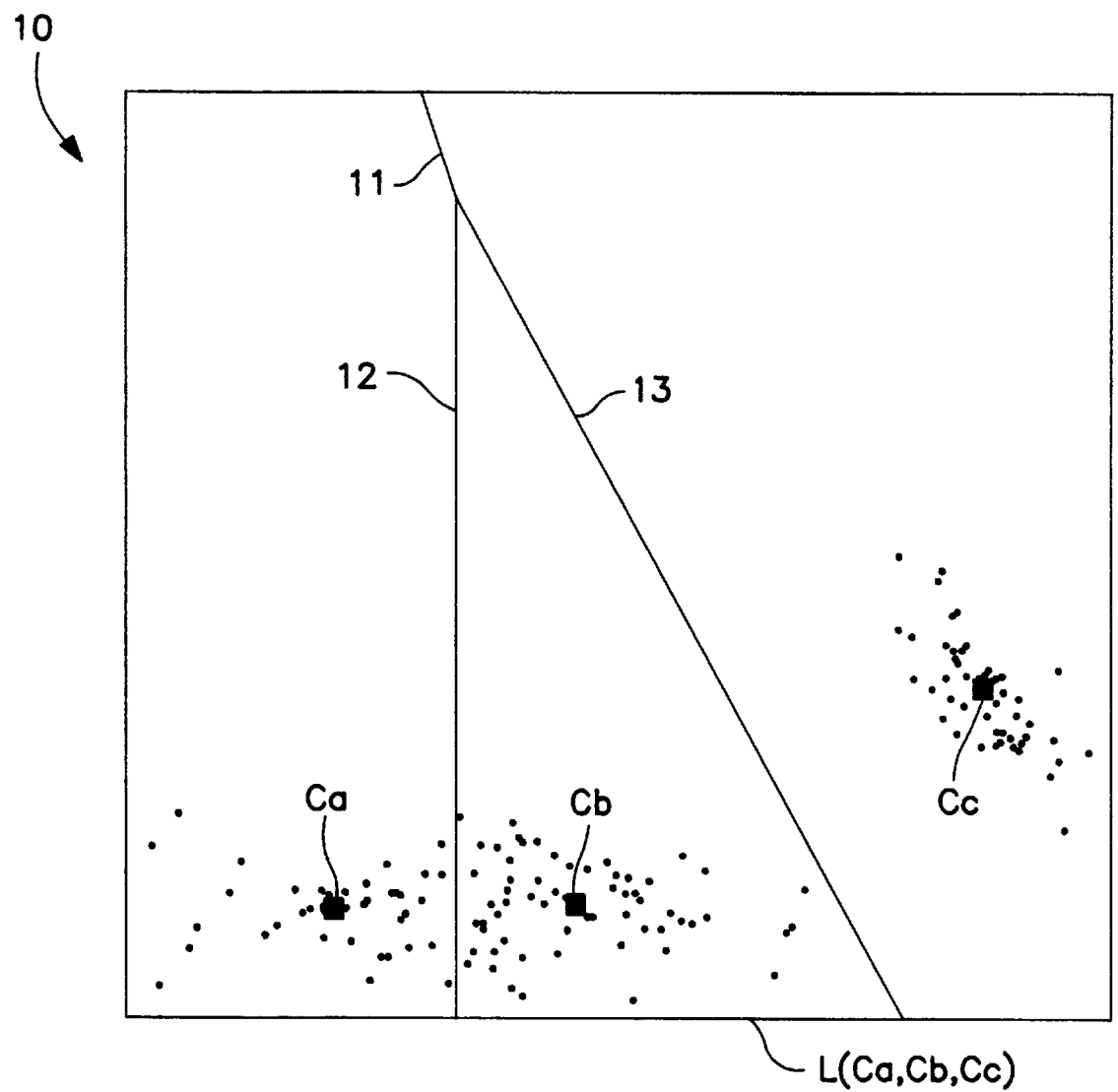
FIG. 1 shows an exemplary 2-dimensional linear cluster projection obtained by partitioning Fisher's Iris data set.

FIG. 1 shows an exemplary 2-dimensional linear cluster projection 10 obtained by partitioning Fisher's Iris data set into 3 clusters. Fisher's Iris data set is disclosed by C. J. Merz et al., UCI repository of machine learning databases, University of California, Department of Information and Computer Science, Irvine, Calif., and incorporated by reference herein. Additionally, Fisher's Iris data set is available on the Internet at http://www.ics.uci.edu./~mlearn/MLRespository.html. The Iris data includes n=150 data points and p=4 dimensions. Clusters generated using the k-means algorithm are separated by (p-1)-dimensional hyperplanes. FIG. 1 is enhanced by also projecting the three-dimensional hyperplanes 11, 12 and 13 separating the three cluster centroids onto the two-plane $L(C_a, C_b, C_c)$.

Figure 2:
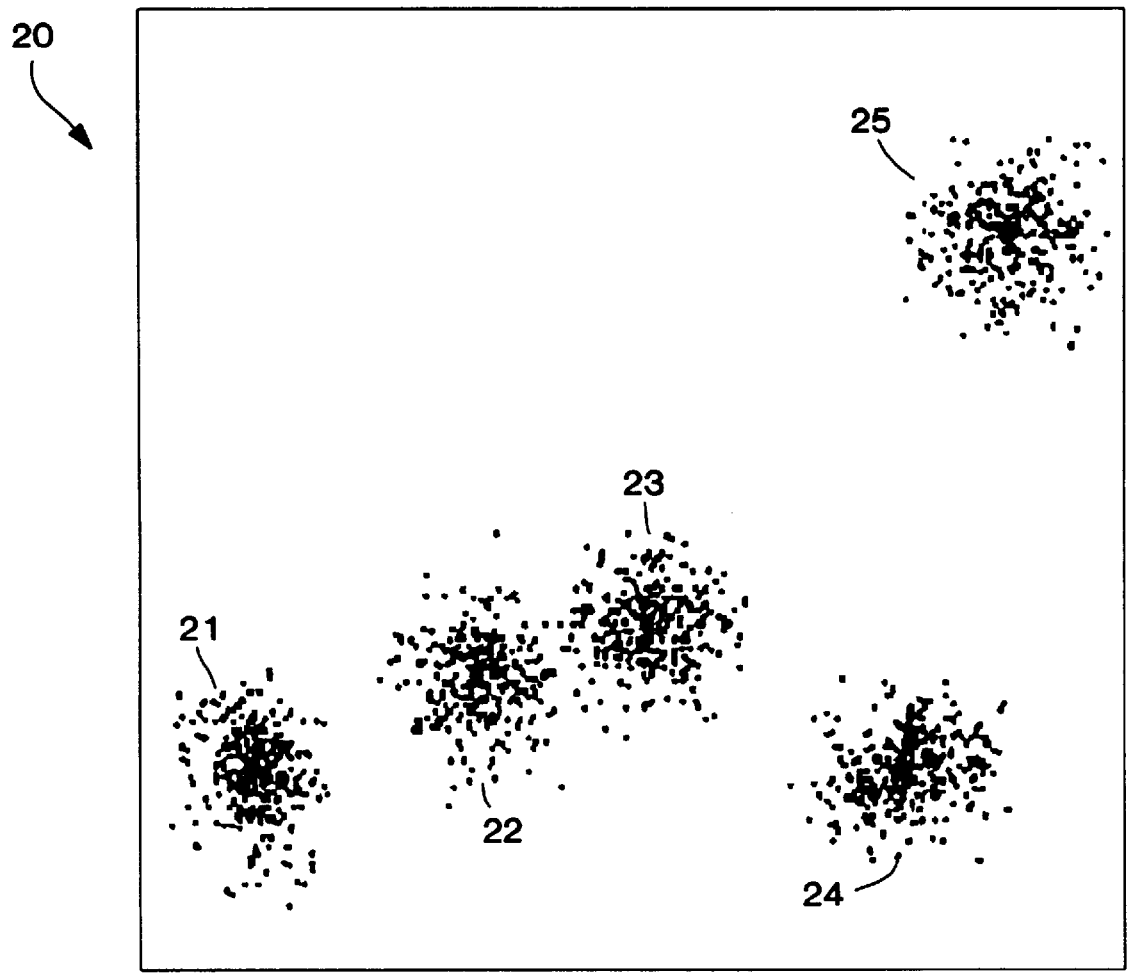
FIG. 2 shows a 2-dimensional linear cluster projection for an artificial test data set having n=1500 data points and p=50 dimensions.

As another example of a 2-dimensional linear cluster projection, an artificial test data set having n=1500 data points and p=50 dimensions, with five of the dimensions being noise dimensions. The artificial data was generated using clusgen.c, which is available at http://alexia.lis.uiuc.edu/~dubin/, and which is based on an algorithm disclosed by G. Milligan, An algorithm for creating artificial test clusters, Psychometrika, 50(1):123–127, 1985, and incorporated by reference herein. The data set was partitioned into k=5 clusters. FIG. 2 shows a 2-dimensional linear cluster projection 20 of the five clusters 21–25. The linear cluster projection of FIG. 2 is but one of the $\binom{5}{3}$ possible projections for the artificial test data set.

A 2-dimensional nonlinear cluster projection can be computed by computing the Euclidean distance of each data point $X_i$, $1 \le i \le n$, to each of the two distinct cluster centroids in $C_a$ and $C_b$ in $\{C_j\}_{j=1}^k$. Given k cluster centroids, there are at most $\binom{k}{2}$ unique 2-dimensional nonlinear cluster projections. Each nonlinear cluster projection allows the multidimensional data set to be visualized in relation to a pair of cluster centroids.

An exemplary algorithm for computing a 2-dimensional nonlinear cluster projection is given by the following pseudocode:

```
proc NonlinearProjec (n,{X_i}^n_{i=1}, K_1, K_2) ≡
    x: = 1; y: = 1;
    for i: = 1 to n step 1 do
        V_i(x): = d_2(X_i, C_a); V_i(y): = d_2Z(X_i,C_b)
    od;
    return ({V_i}^n_{i=1});
end
```

Figure 3:
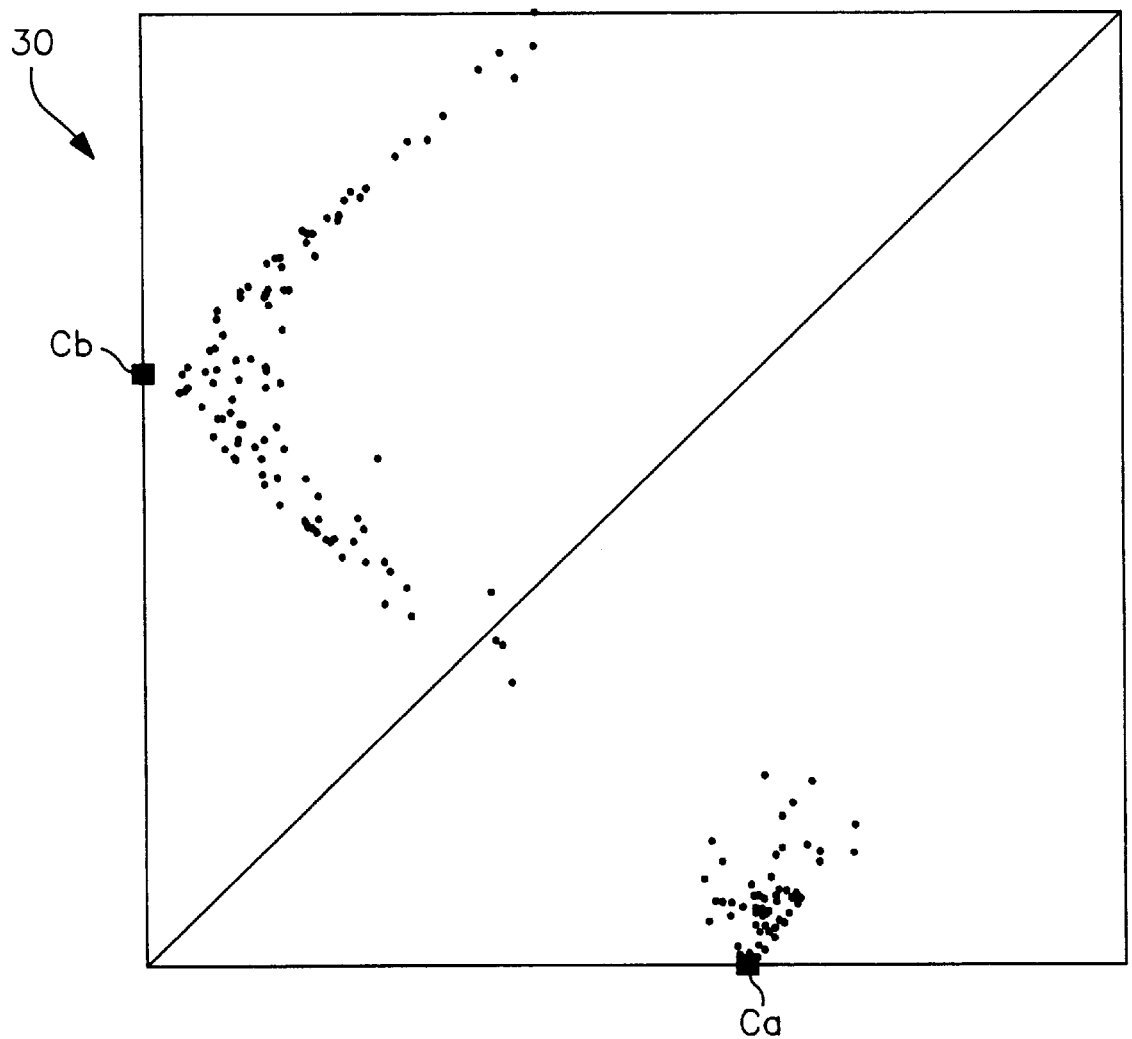
FIG. 3 shows a 2-dimensional nonlinear cluster projection obtained by partitioning Fisher's Iris data set.

FIG. 3 shows a 2-dimensional nonlinear cluster projection 30 obtained by partitioning Fisher's Iris data set into two clusters having centroids $C_a$ and $C_b$. Unlike linear cluster projections, nonlinear cluster projections are not a projection of the data onto a two-plane. To aid in interpreting FIG. 3, nonlinear cluster projections have the following properties:

1. For any two points X and Y in $R^p$, the Euclidean distance between X and Y is $d_2(X,Y) \ge 0$. Thus, nonlinear cluster projections are contained entirely in the positive quadrant. Furthermore, the y-coordinate of $C_a$ and the x-coordinate of $C_b$ are the same, namely the distance $d_2(C_a, C_b)$ between $C_a$ and $C_b$. See, for example, the locations of centroids $C_a$ and $C_b$ in FIG. 3.

Let X be a point in $R^p$. It follows from the triangle inequality that $$d_2(C_a, C_b) \le d_2(C_a, X) + d_2(X, C_b)$$

$$d_2(X, C_a) - d_2(X, C_b) \le d_2(C_a, C_b) \quad (5)$$

$$d_2(X, C_b) - d_2(X, C_a) \le d_2(C_a, C_b)$$

The inequalities of Eq. (5) imply that no point can ever appear in any of the following regions:

$$\{x \ge 0\} \cap \{y \ge 0\} \cap \{x + y < d_2(C_a, C_b)\},$$

$$\{x \ge 0\} \cap \{x - y > d_2(C_a, C_b)\}, \quad (6)$$

$$\{y \ge 0\} \cap \{y - x > d_2(C_a, C_b)\}.$$

Figure 4:
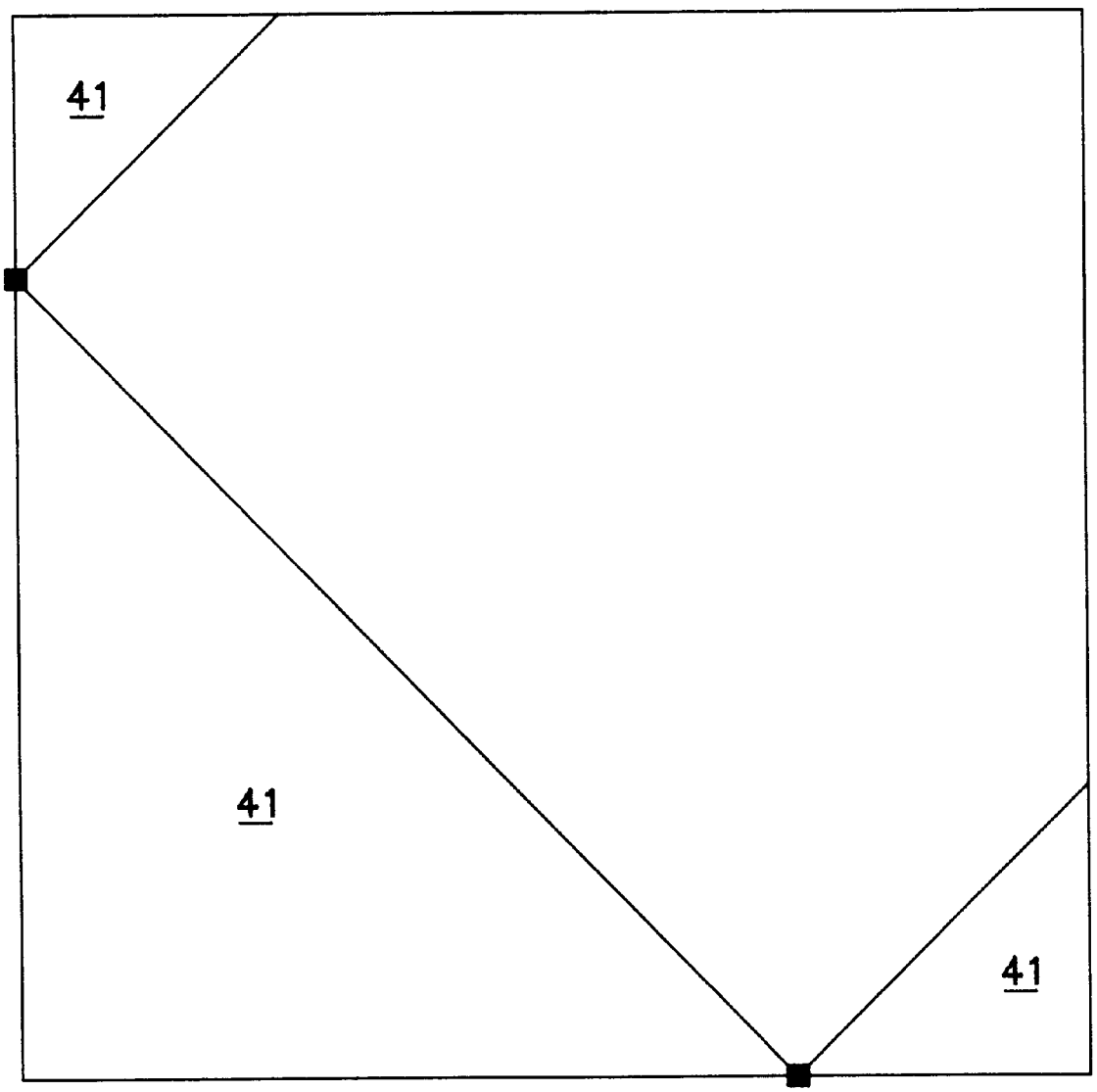
FIG. 4 shows "taboo" regions for data points for the 2-dimensional nonlinear cluster projection of FIG. 3.

The "taboo" regions are indicated in FIG. 4 by regions 41.

2. Similar to linear cluster projections, two points that are close in $R^p$ will remain close in a nonlinear cluster projection. Further, two points that are close in the nonlinear cluster projection, however, may not necessarily be close in $R^p$.

3. Consider a sphere $S_p(C,r)$ in $R^p$ defined as $$S_p(C,r) = \{X : \|X - C\| \le r\}. \quad (7)$$

and a ball $B(C,r)$ in $R^p$ defined as $$B_p(C,r)=\{X:\|X-C\|\leq r\}. \qquad (8)$$

Figure 5A:
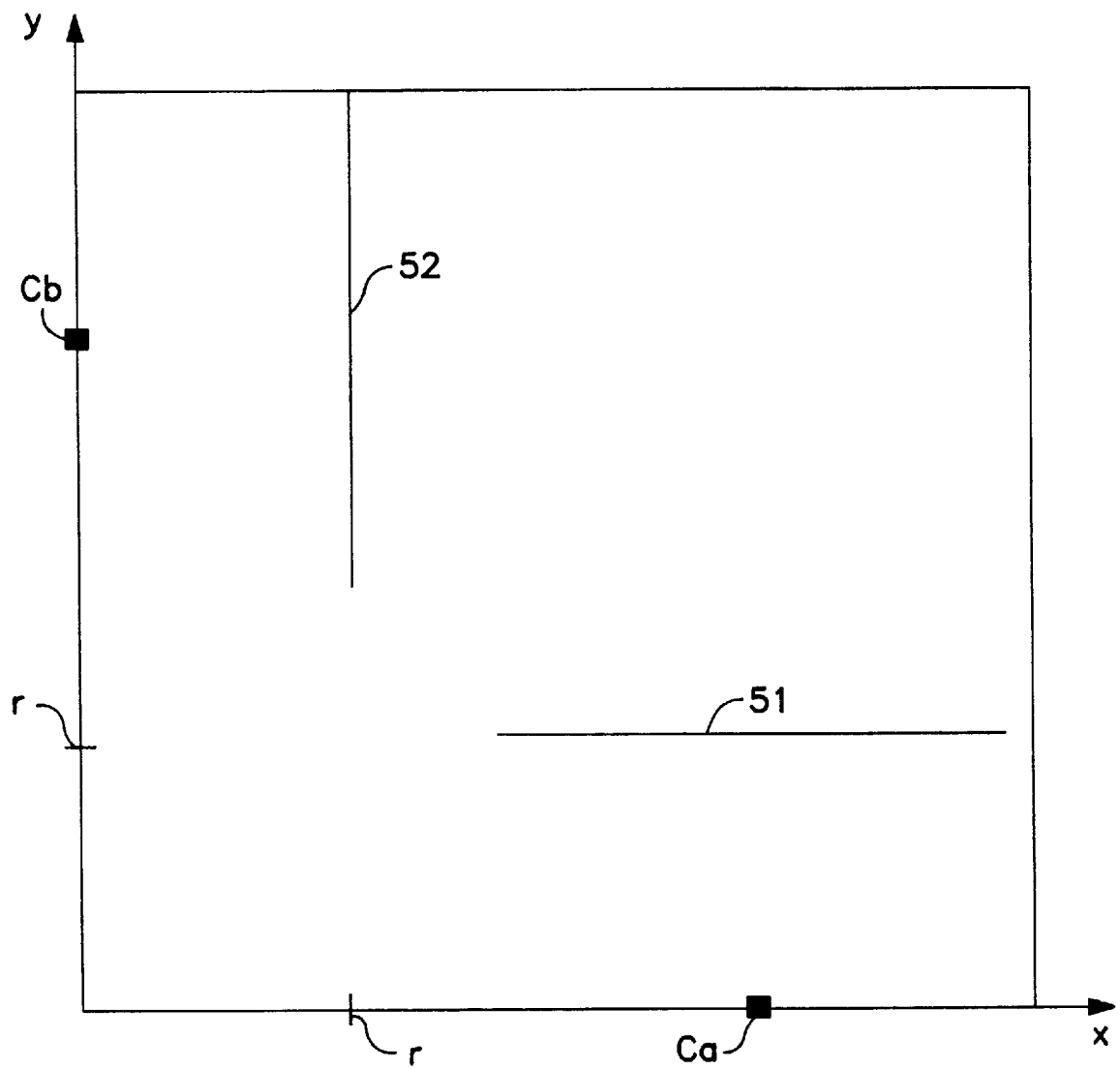
FIG. 5(a) shows 2-dimensional nonlinear cluster projections for spheres $S_p(C_a,r)$ and $S_p(C_b,r)$.
Figure 5B:
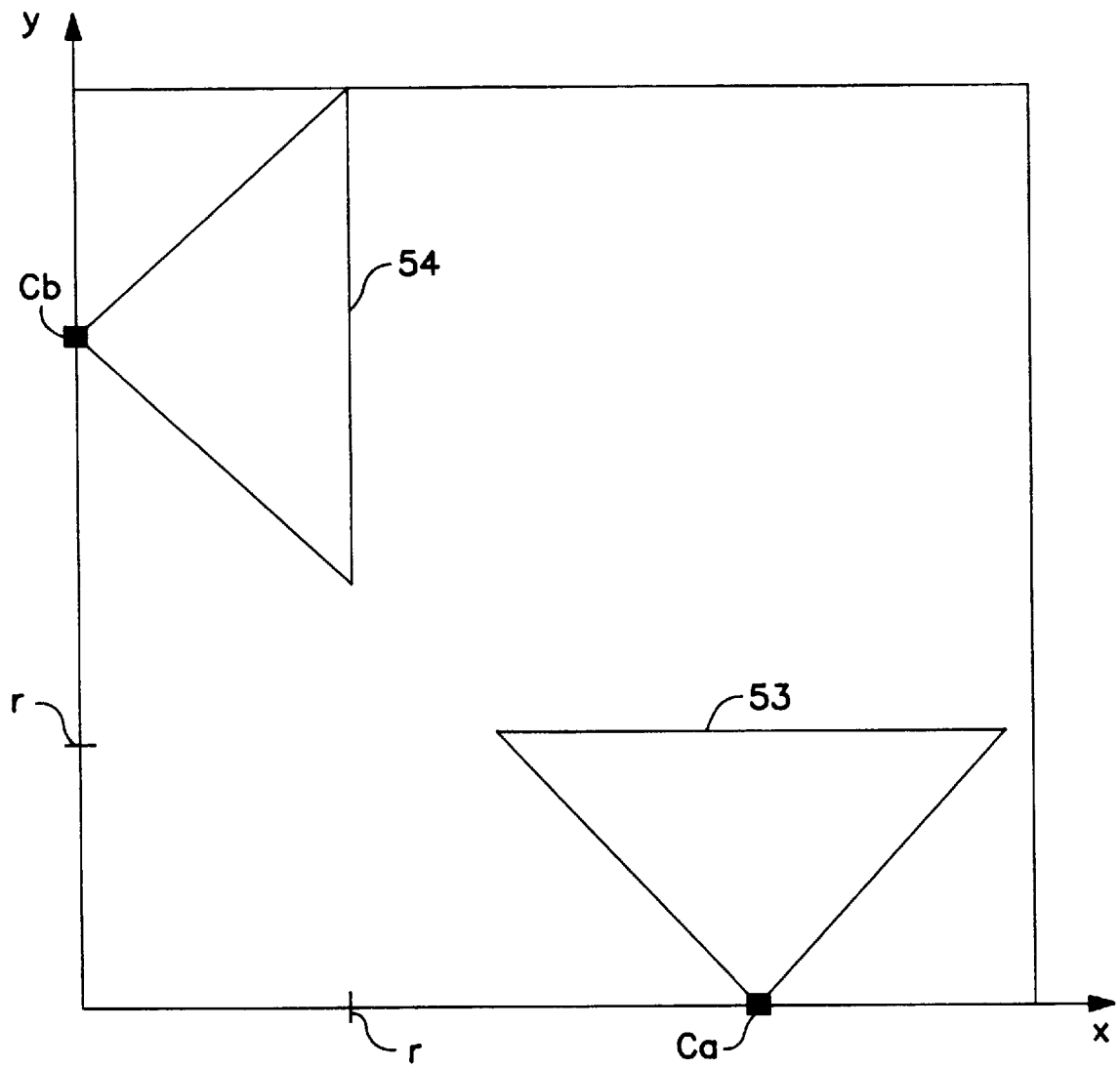
FIG. 5(b) shows 2-dimensional nonlinear cluster projections for points lying inside of balls $B_p(C_a,r)$ and $B_p(C_b,r)$.

Points lying on the sphere $S_p(C_a,r)$ (or $S_p(C_b,r)$) having a center $C_a$ (or $C_b$) and a radius $r$ appear on a line that is parallel to and at a distance $r$ from the y-axis (or x-axis) in a nonlinear cluster projection of the sphere. FIG. 5(a) shows 2-dimensional nonlinear cluster projections 51 and 52 for spheres $S_p(C_a,r)$ and $S_p(C_b,r)$, respectively. It follows that points lying inside the ball $B_p(C_a,r)$ (or $B_p(C_b,r)$) having a center $C_a$ (or $C_b$) and a radius $r$ appear inside a cone in the nonlinear cluster projections. FIG. 5(b) shows 2-dimensional nonlinear cluster projections 53 and 54 for points lying inside of balls $B_p(C_a,r)$ and $B_p(C_b,r)$ respectively. Points lying on a line connecting two centroids in $R^p$ will appear on the line connecting the two centroids in $R^p$.

Figure 6:
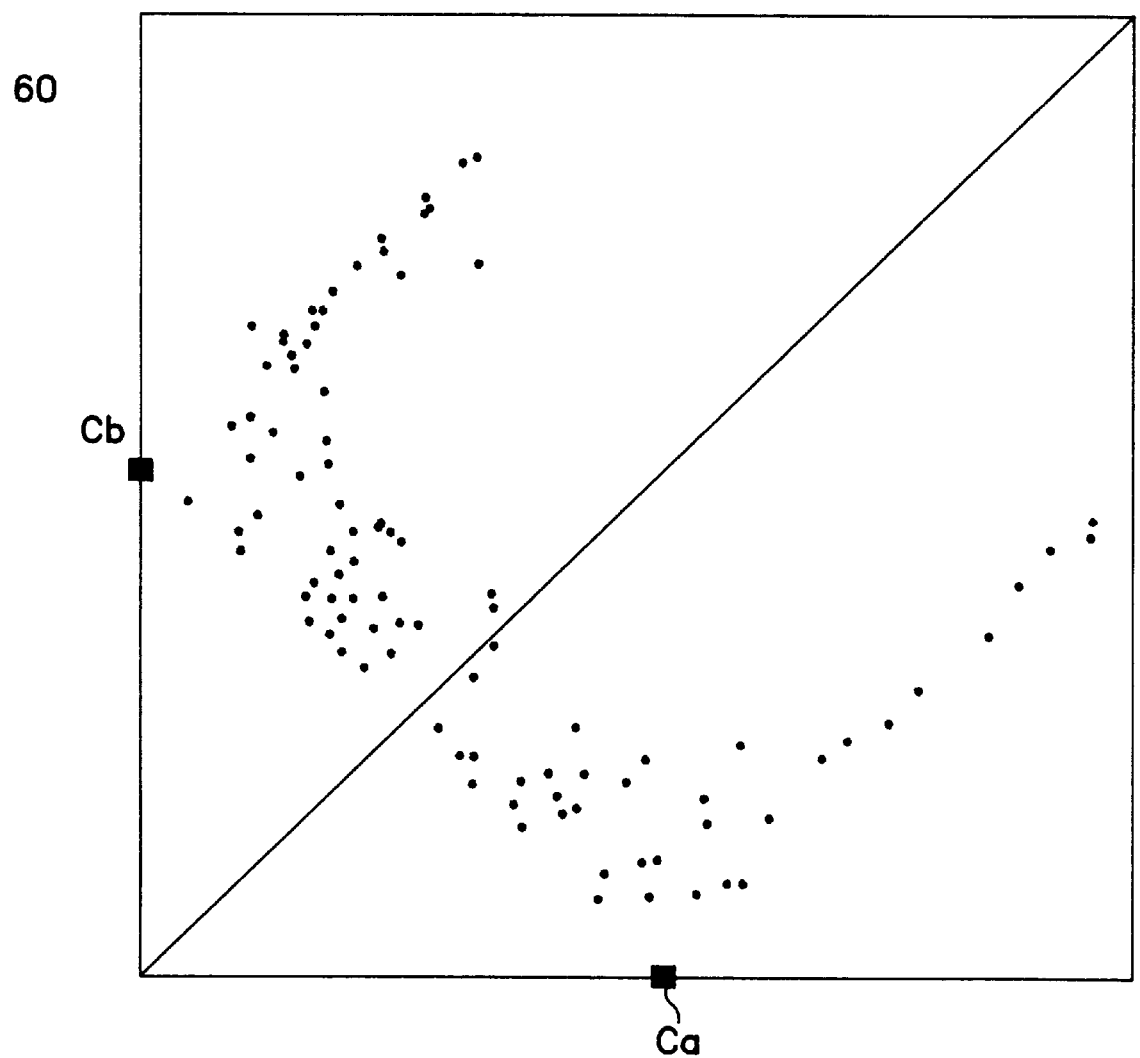
FIG. 6 shows a 2-dimensional nonlinear cluster projection obtained by clustering the data points contained in the upper cluster shown in FIG. 3 into 2 clusters.

Using the properties for interpreting 2-dimensional nonlinear cluster projections discussed so far, it can be seen from FIG. 3 that Fisher's Iris data set may consist of two ball-like structures having centroids $C_a$ and $C_b$, respectively. Further clustering all data points contained only in the cluster of centroid $C_b$ into 2 clusters and performing a 2-dimensional nonlinear cluster projection of the cluster of centroid $C_b$, it can be seen that the cluster of centroid $C_b$ may be composed of two ball-like structures. FIG. 6 shows a 2-dimensional nonlinear cluster projection 60 obtained by clustering the data points contained in the cluster of centroid $C_b$ of FIG. 3 into 2 clusters. This interpretation is, in fact, the correct interpretation for Fisher's Iris data set. See, for example, FIG. 6.11 of R. O. Duda et al., Pattern Classification and Scene Analysis, Wiley, 1973.

Figure 7:
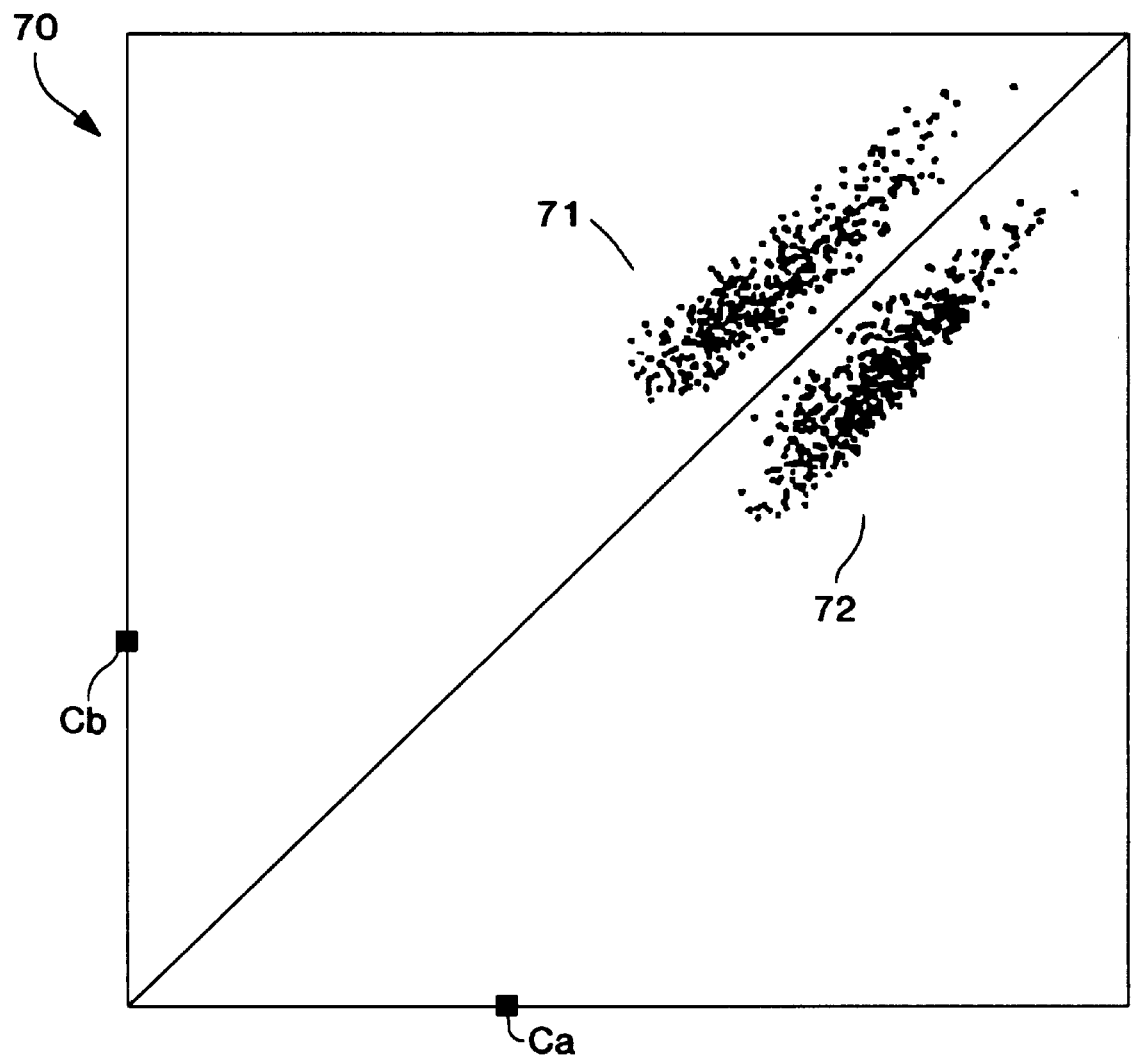
FIG. 7 shows a 2-dimensional nonlinear cluster projection of a binary insurance data set.

4. If there are no points around a centroid in a 2-dimensional nonlinear cluster projection, then the centroid does not provide a good representation for any single data point in the cluster that the centroid represents. To illustrate this, consider p-dimensional binary data. Each data point in a p-dimensional binary data set coincides with a vertex of the p-dimensional hypercube for the data set. Each cluster centroid is simply an average of the data points contained in the cluster, so cluster centroids can generally take on fractional values. Consequently, cluster centroids for binary data reside inside the hypercube and not on the vertices of the hypercube among the data points. This concept is shown in FIG. 7 which is a 2-dimensional nonlinear cluster projection 70 for a binary insurance data set having n=13743 data points and p=56 dimensions is clustered into two clusters. Centroids $C_a$ and $C_b$ do not reside among the data points for their respective clusters. The binary insurance data for this example was obtained from a real, but anonymous, insurance company.

Figure 8:
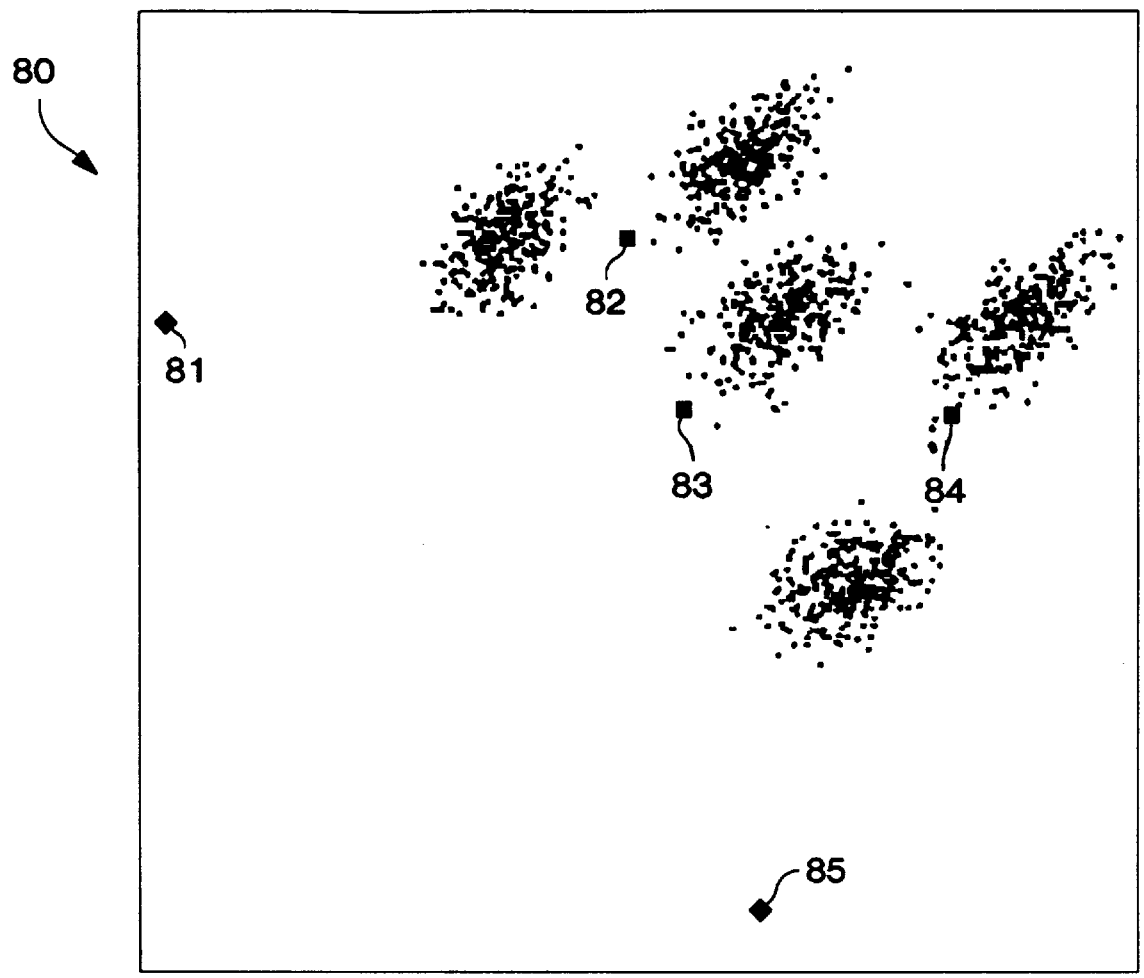
FIG. 8 shows a 2-dimensional nonlinear cluster projection of the artificial data set used in FIG. 3 clustered into 5 clusters.

As another example, the artificial test data used earlier was partitioned into 5 clusters. FIG. 8 shows one of the $\binom{5}{2}$ possible 2-dimensional nonlinear cluster projections 80. Comparing FIG. 8 with FIG. 2, it can be seen that the respective cluster centroids 81–85 are not necessarily a good representation of the data points contained in each corresponding clusters. This effect is caused by noise dimensions within the artificial test data.

To visualize a multi-dimensional data set $\{X_i\}_{i=1}^n$ that has been partitioned into k clusters using the k-means algorithm in relation to the cluster centroids $\{C_j\}_j^k$, instead of just in relation to a triplet or a pair of cluster centroids, the present invention uses concepts of a grand tour and of a guided tour to create an illusion of motion by moving smoothly from one projection to the next using interpolation. For background regarding grand tours, see, for example, D. Asimov, The grand tour: A tool for viewing multidimensional data, SIAM Journal on Scientific and Statistical Computing, 6(1), pp. 128–143, 1985; D. Asimov et al., Grand tour methods: an outline, Proceedings of the 17th Symposium on Interface of Computer Science and Statistics, 1985; and A. Buja et al., Dynamic projections in high-dimensional visualization: Theory and computational methods, Journal of Computational and Graphical Statistics, 1998. For background regarding guided tours, see for example, D. Cook et al., Grand tour and projection pursuit, Journal of Computational and Graphical Statistics, 4(3), pp. 155–172, 1995; and C. Hurley et al., Analyzing high-dimensional data with motion graphics, SIAM Journal of Scientific and Statistical Computing, 11(6), pp. 1193–1211, 1990.

Previously, $\binom{k}{3}$ 2-dimensional linear cluster projections and $\binom{k}{2}$ 2-dimensional nonlinear cluster projections were computed for the multi-dimensional data set $\{X_i\}_{i=1}^n$. Each 2-dimensional linear and each nonlinear cluster projection is like a "photograph". An illusion of motion is created by moving smoothly from one projection to the next using interpolation. As many as four dimensions may be conveyed at a time by the motion, that is, two dimensions corresponding to the projection and two (or less) dimensions corresponding to the velocity of the projection. A smooth path through a 2-dimensional linear projection is referred to herein as a linear cluster-guided tour. Similarly, a nonlinear cluster projection is referred to herein as a nonlinear cluster-guided tour. In contrast, cluster-guided tour provide a dynamic, more global perspective on the data set.

The basic idea behind a linear cluster-guided tour is simple: Select a target 2-dimensional linear cluster projection at random from $\binom{k}{3}$ possible projections, move smoothly from the current projection to the target projection, and continue. To illustrate this, let $L_c\equiv L(C_a,C_b,C_c)$ and $L_t\equiv L(C_d,C_e,C_f)$ respectively denote a current two-plane and a target two-plane. According to the invention, a geodesic interpolation path is used for moving between the current and the target planes. Such a geodesic interpolation path is simply a rotation in the (at most) 4-dimensional linear subspace containing both the current and the target two-planes.

The basic idea behind a nonlinear cluster-guided tour is essentially the same as that for a linear cluster-guided tour. That is, select a target 2-dimensional nonlinear cluster projection at random from $\binom{k}{2}$ possible projections, move smoothly from the current projection to the target projection, and continue. The present invention provides two techniques for providing a nonlinear cluster-guided tour based on interpolating centroids and based on interpolating projections.

To illustrate a nonlinear cluster-guided tour based on interpolating centroids, consider a current projection that is determined by cluster centroids $C_a$ and $C_b$, and a target projection that is determined by cluster centroids $C_c$ and $C_d$. A pair of interpolated "centroids" are defined as $$C_1(t)=tC_c+(1-t)C_a,\ C_2(t)=tC_d+(1-t)C_b, \qquad (9)$$

or as $$C_1(t)=tC_d+(1-t)C_a,\ C_2(t)=tC_c+(1-t)C_b, \qquad (10)$$

where $t$ is the interpolation parameter and is defined as $0\leq t\leq 1$. In Eq. (9), as $t$ moves from 0 to 1, the interpolated centroid $C_1(t)$ moves from $C_a$ to $C_c$ along the straight line joining $C_a$ to $C_c$. Similarly, the interpolated centroid $C_2(t)$ moves from $C_b$ to $C_d$ along the straight line joining $C_b$ to $C_d$. In Eq. (10), as $t$ moves from 0 to 1, the interpolated centroid $C_1(t)$ moves from $C_a$ to $C_d$ along the straight line joining $C_a$ to $C_d$, and the interpolated centroid $C_2(t)$ moves from $C_b$ to $C_c$ along the straight line joining $C_b$ to $C_c$. An interpolated 2-dimensional nonlinear cluster projection is obtained by computing the Euclidean distance of each point in the data set to each of the two interpolated "centroids". An exemplary algorithm for implementing a nonlinear cluster-guided tour based on interpolated centroids is given by the following pseudocode:

```
proc NonlinearClusterGuidedTourA (n,{X_i}^n_{i=1}, {C_j}^k_{j=1}, stepSize) ≡
    (G_1,G_2): = ChooseRandomlyFrom({C_j}^k_{j=1});
    while (true) do
        (F_1,F_2): = ChooseRandomlyFrom({C_j}^k_{j=1});
        for t: = 0.0 to 1 step stepSize do
            H_1: = t + F_1 + (1 − t) + G_1;
            H_2: = t + F_2 + (1 − t) + G_2;
            interpolatedPlot: = NonlinearProject(n,{X_i}^n_{i=1}, H_1, H_2);
            ScatterPlot (interpolatedPlot);
        od;
        (G_1,G_2): = (F_1,F_2)
    od;
end
```

When the dimension p of the underlying data is large, computing new nonlinear projections at each intermediate step of a tour using the exemplary pseudocode algorithm for interpolated centroids can be computationally demanding. To alleviate the computational difficulty, the present invention can also generate a nonlinear cluster-guided tour based on interpolating projections instead of being based on interpolating centroids. The nonlinear cluster projections for both a current and a target projections can be computed to be $\{d_2(X_i,C_a),d_2(X_i,C_b)\}_{i=1}^n$ and $\{d_2(X_i,C_c),d_2(X_i,C_d)\}_{i=1}^n$, respectively. The interpolated projections are computed as $$(td_2(X_i,C_c)+(1-t)d_2(X_i,C_a),\ td_2(X_i,C_d)+(1-t)d_2(X_i,C_b)),\ 1\leq i\leq n, \quad (11)$$

or as $$(td_2(X_i,C_d)+(1-t)d_2(X_i,C_a),\ td_2(X_i,C_c)+(1-t)d_2(X_i,C_b)),\ 1\leq i\leq n, \quad (12)$$

where the interpolation parameter t is defined as $0\leq t\leq 1$. An exemplary algorithm for implementing a nonlinear cluster-guided tour based on interpolated projections is given by the following pseudocode:

```
proc NonlinearClusterGuidedTourB (n,{X_i}^n_{i=1},{C_j}^k_{j=1}, stepSize) ≡
    (G_1,G_2): = ChooseRandomlyFrom({C_j}^k_{j=1});
    currentPlot: = NonlinearProject(n,{X_i}^k_{i=1},G_1,G_2);
    while (true) do
        (G_1,G_2): = ChooseRandomlyFrom({C_j}^k_{j=1});
        targetPlot: = NonlinearProject(n,{X_i}^n_{i=1},G_1,G_2);
        for t: = 0.0 to 1 step stepSize do
            interpolatedPlot: = t * targetPlot + (1 − t) * currentPlot;
            ScatterPlot (interpolatedPlot);
        od;
        currentPlot: = targetPlot;
    od;
end
```

Although an interpolated projection is computationally faster than projecting onto interpolated centroids, interpolated projections in Eq. (11) or in Eq. (12) cannot be interpreted in terms of Euclidean distances from a set of fixed points.

The information loss for both linear and nonlinear cluster-guided tours can be quantitatively characterized in terms of an average least-squares reconstruction error as a figure of merit. To illustrate this, consider any three cluster centroids $C_a$, $C_b$ and $C_c$ in $\{C_j\}_{j=1}^k$. The two-plane determined by the three points $L(C_a,C_b,C_c)$ is contained in the linear subspace $$L(\{C_j\}_{j=1}^k = \{C_2-C_1, C_3-C_1, \ldots, C_k-C_1\}. \quad (13)$$

In other words, each of the $\binom{k}{3}$ 2-dimensional linear cluster projections is contained in $L(\{C_j\}_{j=1}^k)$. A smooth geodesic path from a current plane to a target plane is simply a rotation in the (at most) 4-dimensional space containing the current and the target planes. Consequently, every intermediate two-plane on the smooth path from any 2-dimensional linear cluster projection to any other linear cluster projection is in $L(\{C_j\}_{j=1}^k)$. Effectively, the entire linear cluster-guided tour is contained in $L(\{C_j\}_{j=1}^k)$. Data features that are not contained in $L(\{C_j\}_{j=1}^k)$ will be completely missed by a data analyst observing a linear cluster-guided tour. That is, having observed a linear cluster-guided tour, a data analyst can reconstruct the original data set with no more accuracy that the amount of data variance contained in $L(\{\}_{j=1}^k)$.

To show this, let $k'\leq(k-1)$ denote the dimension of $L(\{C_j\}_{j=1}^k)$ and let $\{K_j\}_{j=1}^{k'}$ denote an orthonormal basis for $L(\{C_j\}_{j=1}^k)$. The dimension $k'$ may be less than $(k-1)$ because vectors $(C_j-C_1)$ for $2\leq j\leq k$ may not be linearly independent. Having observed the linear cluster-guided tour, an analyst can learn the $k'$ dimensional projection of each data point $X_i$, $1\leq i\leq n$, namely $$(X_i \cdot K_1, X_i \cdot K_2, \ldots, X_i \cdot K_{k'}). \quad (14)$$

Based on Eq. (14) and $\{K_j\}_{j=1}^{k'}$, the best least-squares estimate of $X_i$ is $$\hat{X}_i^{(L,k)} = \sum_{j=1}^n (X_i \circ K_j)K_j \in R^p. \quad (15)$$

The information loss of linear cluster-guided tours is an average least-squares reconstruction error and is given by $$E_L(k) = \frac{1}{n}\sum_{i=1}^n d_2^2\left(X_i, \hat{X}_i^{(L,k)}\right). \quad (16)$$

Suppose that a data analyst has watched either of the two nonlinear cluster-guided tours represented by Eqs. (9) and (10), and Eqs. (11) and (12). Arguably, for every data point $X_i$ for $1\leq i\leq n$ the analyst "knows" the Euclidean distance from $X_i$ to each of the k cluster centroids, that is, $$(D_{i1},D_{i2},\ldots,D_{ik}) \quad (17)$$

where $$D_{ij}^2 = \|X_i - C_j\|^2,\ 1\leq j\leq k. \quad (18)$$

Given these distances, the data point $X_i$ must lie on the intersection of k spheres, $S_p(C_j,D_{ij})$, $1\leq j\leq k$. That is, the data point $X_i$ must lie on $$\cap_{j=1}^k S_p(C_j,D_{ij}). \quad (19)$$

This intersection is a (p−k)-dimensional sphere in the linear variety $N^{195}$ ($\{C_j\}_{j=1}^k$), where $N^\perp(\{C_j\}_{j=1}^k)$ denotes a linear variety obtained by translating the orthogonal complement of the linear subspace $L(\{C_j\}_{j=1}^k)$. Since the data point $X_i$ can appear anywhere on the (p−k)-dimensional sphere, in the absence of further information, the nonlinear projection $\hat{X}_i^{(N,k)}$ of $X_i$ is defined as the center of the (p−k)-dimensional sphere. In this case, the least-squares reconstruction error between $\hat{X}_i^{(N,k)}$ and $X_i$ is simply the radius of the (p−k)-dimensional sphere.

Figure 9:
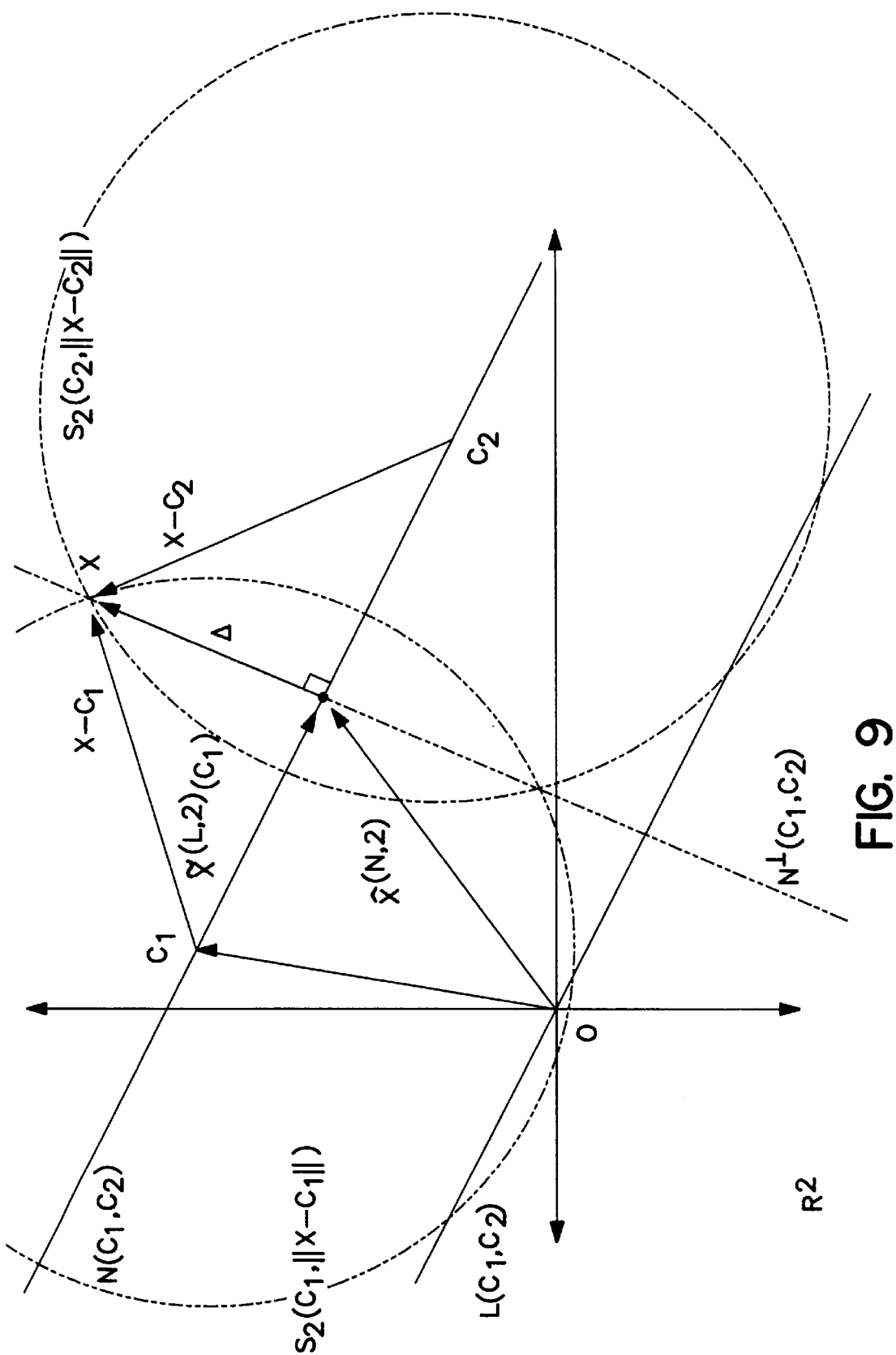
FIG. 9 shows a complete 2-dimension al example for a general p-dimensional case of a nonlinear projection.

FIG. 9 shows a complete 2-dimensional example illustrating the intuition behind the general p-dimensional case for a nonlinear projection. Consider a data point X that is fixed in $R^2$. Let $C_1$ and $C_2$ denote two cluster centroids in $R^2$. Suppose that the distances $\|X-C_1\|$ and $\|X-C_2\|$ are known. Based on this information, X must lie on the intersection of the spheres $S_2(C_1, \|X-C_1\|)$ and $S_2(C_2, \|X-C_2\|)$. The spheres intersect in two points that form a 0-dimensional sphere. Because data point X can be either of the two intersection points, the nonlinear projection $\hat{X}_i^{(N,2)}$ selected to be the point that is equi-distant from both intersection points. This equi-distant point is precisely the center of the 0-dimensional sphere. $\hat{X}_i^{(N,2)}(C_1)$ denotes the linear projection of $(X-C_1)$ onto the linear space $L(C_1,C_2)=\text{span}\{C_2-C_1\}$. By definition of linear projection, $\Delta$ is orthogonal to $\hat{X}_i^{(N,2)}(C_1)$, and $\|\Delta\|^2 = \|X-C_1\|^2 - \|\hat{X}_i^{(N,2)}(C_1)\|^2$ can be computed. The nonlinear projection of X can be written as $\hat{X}_i^{(N,2)} = \hat{X}_i^{(L,2)}(C_1) + C_1$. The least-squares reconstruction error between X and $\hat{X}_i^{(N,2)}$ is $\|\Delta\|^2$, which is known from above. $\hat{X}_i^{(N,2)}$ lies on the space $N(C_1,C_2)$ that is obtained by translating the linear space $L(C_1,C_2)$ by $C_1$ or $C_2$. A need not be orthogonal to $\hat{X}_i^{(N,2)}$ and the origin O need not be contained in the space $N(C_1,C_2)$; hence, a nonlinear projection.

Based on this, the reconstruction error $d_2^2(X_i, \hat{X}_i^{(N,k)})$ can be computed. The information loss of nonlinear cluster-guided tours can then be computed as the average least-squares reconstructive error and is given by $$E_n(k) \equiv \frac{1}{n} \sum_{i=1}^{n} d_2^2\left(X_i, \hat{X}_i^{(N,k)}\right). \tag{20}$$

The k equations in Eq. (18) can be simplified using simple algebraic manipulation to obtain (k−1)-linear equations $$(C_j-C_1)\cdot(X_i-C_1)=\tfrac{1}{2}(d_2^2(C_j,C_1)-D_{ij}^2+D_{i1}^2),\ 2\leq j\leq k, \tag{21}$$

and a quadratic equation $$\|X_i-C_1\|^2=D_{i1}^2. \tag{22}$$

Using the (k−1) linear equations in Eq. (21), a linear projection of $(X_i-C_1)$ can be computed, for example $\hat{X}_i^{(N,k)}(C_1)$, onto the linear subspace $$L(\{C_j\}_{j=1}^{k})=\text{span}\{C_2-C_1,C_3-C_1,\ldots,C_k-C_1\}. \tag{23}$$

By definition of linear projection, $\Delta_i=((X_i-C_1)-\tilde{X}_i^{(L,k)}(C_1))$ and $\tilde{X}_i^{(L,k)}(C_1)$ are orthogonal. Thus, the least-squares error between $(X_i-C_1)$ and $\tilde{X}_i^{(L,k)}(C_1)$ can be computed as $$\|\Delta_i\|^2=\|(X_i-C_1)-\tilde{X}_i^{(L,k)}(C_1)\|^2=\|X_i-C_1\|^2-\|\tilde{X}_i^{(L,k)}(C_1)\|^2=D_{i1}^2-\|\tilde{X}_i^{(L,k)}(C_1)\|^2, \tag{24}$$

where the second equality follows from orthogonality and Pythagoras' theorem and the third equality follows from Eq. (22). The norm of $\tilde{X}_i^{(L,k)}(C_1)$ can be computed by simple linear algebraic calculations using Eq. (21). Of course, linear projections of $(X_i-C_1)$ are not presently of interest, but a nonlinear projection of $X_i$ can now be written as $$\hat{X}_i^{(N,k)}=\tilde{X}_i^{(L,k)}(C_1)+C_1. \tag{25}$$

Clearly, $$\|X_i-\hat{X}_i^{(N,k)}\|^2=\|(X_i-C_1)-\tilde{X}_i^{(L,k)}(C_1)\|^2=D_{i1}^2-\|\tilde{X}_i^{(L,k)}(C_1)\|^2, \tag{26}$$

where the last equality follows from Eq. (24). All the information necessary to compute Eq. (20) is now available.

It follows from Eq. (25) that the nonlinear projection $\hat{X}_i^{(N,k)}$ lies on the space $N(\{C_j\}_{j=1}^{k})$, for example, which can be written as $$N(\{C_j\}_{j=1}^{k}) = \{X : X - C_1 \in L(\{C_j\}_{j=1}^{k})\} \tag{27}$$
$$= L(\{C_j\}_{j=1}^{k}) + C_1.$$

There is nothing special about centroid $C_1$, so any other centroid could have been selected as well. This implies that, for any $1 \leq l \leq k$, $$N(\{C_j\}_{j=1}^{k})=L(\{C_j\}_{j=1}^{k})+C_l. \tag{28}$$

That is, the space $N(\{C_j\}_{j=1}^{k})$ is obtained by translating the linear subspace $L(\{C_j\}_{j=1}^{k})$ by any one of the centroids. The space $N(\{C_j\}_{j=1}^{k})$ is not necessarily a linear subspace because it may not contain the origin. When the space $N(\{C_j\}_{j=1}^{k})$ contains the origin, that is, when the space $L(\{C_j\}_{j=1}^{k})$ contains all the centroids $\{C_j\}_{j=1}^{k}$, then $$N(\{C_j\}_{j=1}^{k})=L(\{C_j\}_{j=1}^{k}), \tag{29}$$

and that $$E_N(k)=E_L(k). \tag{30}$$

For any given $k \leq p$, truncated singular value decompositions provide the best linear projections in terms of average least-squares reconstruction error. To compare the average least-squares reconstruction error for linear and nonlinear cluster-guided tours to the least-squares reconstruction error for truncated singular value decompositions, consider an n x p data matrix X such that the i-th row of X is the data vector $X_i$, $1 \leq i \leq n$. Using the singular value decomposition, disclosed by W. H. Press et al., Numerical Recipes in C: The Art of Scientific Computing, Cambridge University Press, 1992, $$X=U\Sigma V^T, \tag{31}$$

where $\Sigma=\text{diag}(\sigma_1,\sigma_2,\ldots,\sigma_p)$ is a p×p diagonal matrix of singular values, U is an n×p matrix of right singular vectors, and V is a p×p matrix of left singular vectors such that $U^T U=VV^T=I_{p \times p}$. Without any loss of generality, assume that $\sigma_1 \geq \sigma_2 \geq \ldots \geq \sigma_p$. For $1 \leq k \leq p$, let $\Sigma_k$ denote the p×p diagonal matrix obtained from $\Sigma$ by setting its smallest (p−k) singular values to zero. An approximation to the data matrix can be constructed as $$X=U\Sigma_k V^T \tag{32}$$

such as the i-th row of $X_k$, say $\hat{X}_i^{(S,k)}$, is an approximation to the i-th row of X, for $1 \leq i \leq n$. It is well-known that the average least-squares reconstruction error of such truncated singular value decompositions is $$E_S(k) \equiv \frac{1}{n}\sum_{i=1}^{n} d_2^2\left(X_i, \hat{X}_i^{(S,k)}\right) = \frac{1}{n}\sum_{j=k+1}^{p} \sigma_j^2. \tag{33}$$

Figure 10A:
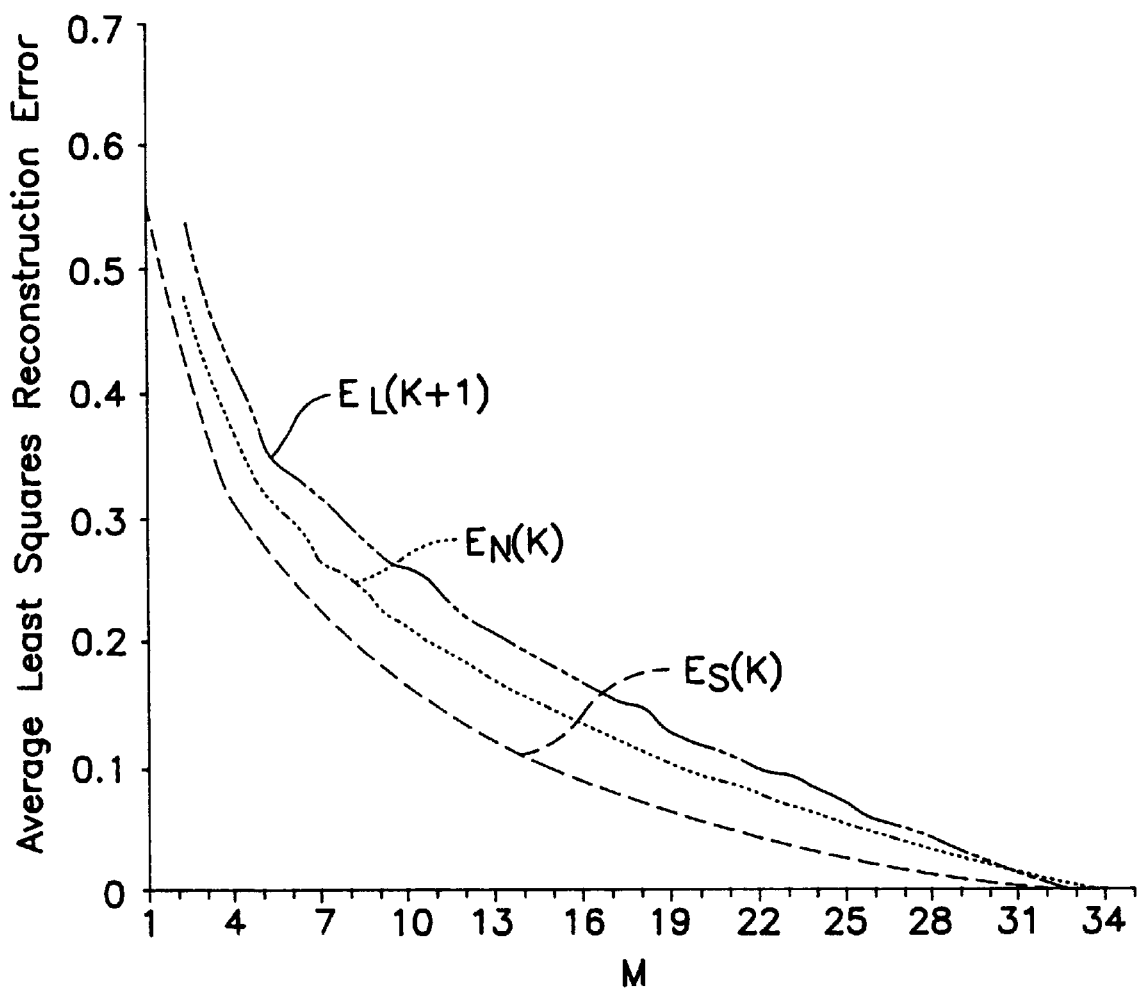
FIG. 10(a) shows $E_L(k+1)$, $E_N(k)$, and $E_S(k)$ for the Ionosphere data set plotted as a function of k.

FIG. 10(a) shows an Ionosphere data set having n=351 data points and p=34 dimensions, $E_L(k+1)$, $E_N(k)$, and $E_S(k)$ plotted as a function of k, where k denotes the number of clusters for the cluster-guided tours and the truncation parameter for the singular value decomposition. The average least-square reconstruction errors in FIG. 10(a) have been normalized by the quantity $(1/n)\Sigma_{j=1}^n \|X_j\|^2$. The Ionosphere data set is disclosed by C. J. Merz et al., UCI repository of machine learning databases, University of California, Department of Information and Computer Science, Irvine, Calif., and incorporated by reference herein.

In FIG. 10(a), the average least-square error $E_L(k+1)$ for a linear cluster-guided tour having (k+1) clusters is compared to the average least-square error $E_N(k)$ for a nonlinear cluster-guided tour having k clusters, and to the average least-square error $E_S(k)$ for a truncated singular value decomposition having k components because all three average least-square errors essentially define a k-dimensional projection. It can be seen from FIG. 10(a) that as the parameter k increases, $E_L(k+1)$, $E_N(k)$, and $E_S(k)$ decrease monotonically to zero. Thus, larger the parameter k, the smaller the information loss.

Also, it can be seen that $E_L(k+1) \geq E_S(k)$ and that $E_N(k) \geq E_S(k)$, for all $2 \leq k \leq p$. Consequently, truncated singular value decomposition is the best in terms of average least-squares reconstruction error. Surprisingly, though, the linear and nonlinear cluster-guided tours are not much worse than truncated singular value decomposition. Also, $E_L(k+1) \geq E_N(k)$, for all $2 \leq k \leq p$. Hence, for this data set, the nonlinear cluster-guided tours are more informative that linear cluster-guided tours.

Figure 10B:
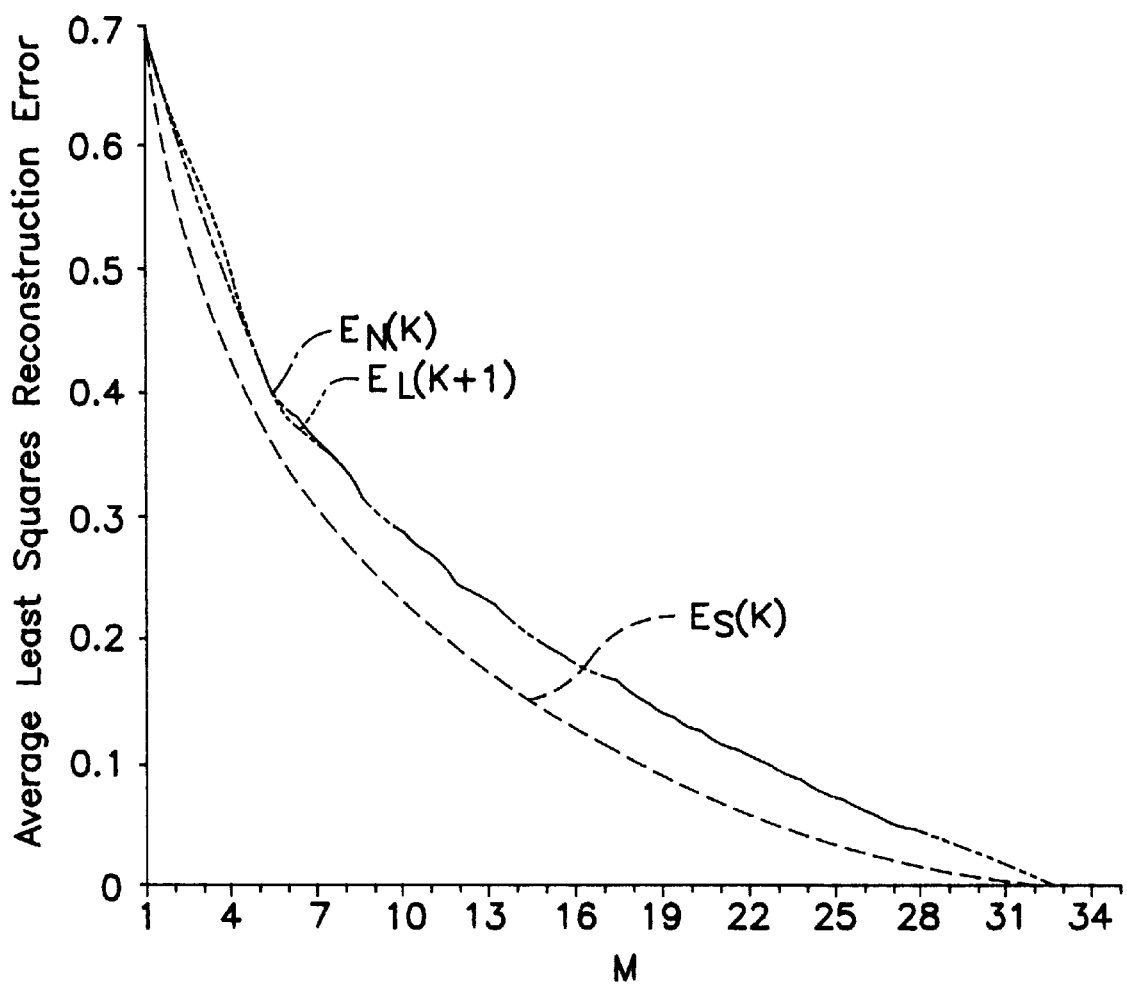
FIG. 10(b)) shows $E_L(k+1)$, $E_N(k)$, and $E_S(k)$ for the Ionosphere data set having data that is centered by subtracting the mean and plotted as a function of k.

In FIG. 10(b), the same comparison as that shown in FIG. 10(a) is repeated, except that the Ionosphere data is centered by subtracting the mean. Again, the average least-square reconstruction errors in FIG. 10(b) have been normalized by the quantity $(1/n)\Sigma_{j=1}^n \|X_j\|^2$. For centered data, the origin is expected to be contained in $N(\{C_j\}_{j=1}^k)$. Consequently, from Eq. (30) that $E_N(k)=E_L(k)$. Thus, in this case, $E_L(k+1)$, $E_N(k+1)$, and $E_S(k)$ are plotted as a function of k, where k denotes the number of clusters for the cluster-guided tours and the truncation parameter for the singular value decomposition. As expected, the average reconstruction errors of linear and nonlinear cluster-guided tours are almost the same. In all other aspects, the behavior shown in FIG. 10(b) is identical to that in FIG. 10(a).

Thus, linear and nonlinear cluster-guided tours are comparable to truncated singular value decompositions. Further, nonlinear cluster-guided tours are superior to linear cluster-guided tours for non-centered data. For sparse data sets, such as text data or market basket data, centering is not a feasible option because the natural sparsity of such a data set would be completely destroyed by centering. In such cases, nonlinear cluster-guided tours are expected to be of greater value that their linear counterpart.

In view of this, the clusters produced by the k-means algorithm depend on the starting centroids that are used for initializing the algorithm. Consequently, slightly different values for the average least-squares reconstruction errors $E_L(k)$ and $E_N(k)$ are obtained for different values of starting centroids. To minimize the fluctuations caused by selection of starting centroids, the values for $E_L(k)$ and $E_N(k)$ shown in FIGS. 10(a) and 10(b) are an average of 10 runs of the k-means algorithm, where each run is initiated with respectively different randomly-selected starting centroids.

For $X \in R^p$, c(X) is defined as the centroid closest to the point X amongst all k centroids $\{C_j\}_{j=1}^k$. By calculating the least-square error for a nonlinear cluster-guided tour, it is possible to show that $$\|X_i-\hat{X}_i^{(N,k)}\|^2=\|(X_i-C_j)-\tilde{X}_i^{(L,k)}(C_j)\|^2=D_{ij}^2-\|\tilde{X}_i^{(L,k)}(C_j)\|^2=\|X_i-C_j\|^2-\|\tilde{X}_i^{(L,k)}(C_j)\|^2 \quad (34)$$

for each $1 \leq j \leq k$. Consequently, $$\|X_i-\hat{X}_i^{(N,k)}\|^2=\|(X_i-c(X_i))-\tilde{X}_i^{(L,k)}(c(X_i))\|^2=\|X_i-c(X_i)\|^2-\|\tilde{X}_i^{(L,k)}(c(X_i))\|^2 \leq \|X_i-c(X_i)\|^2 \quad (35)$$

and $$\frac{1}{n}\sum_{i=1}^n \left\|\left(X_i - \hat{X}_i^{(N,k)}\right)\right\|^2 \leq \frac{1}{n}\sum_{i=1}^n \|X_i - c(X_i)\|^2. \quad (36)$$

The left side of Eq. (36) is $E_N(k)$, while the right side of Eq. (36) is simply the average least-squares error of the k-means algorithm. Thus, the average least-squares reconstruction error of a nonlinear cluster-guided tour is upwardly bounded by the average least-squares error for the k-means algorithm, which seeks to minimize its average least-square error. Consequently, performing the k-means algorithm fortuitously minimizes the average least-squares reconstruction error for a nonlinear cluster-guided tour.

Figure 11:
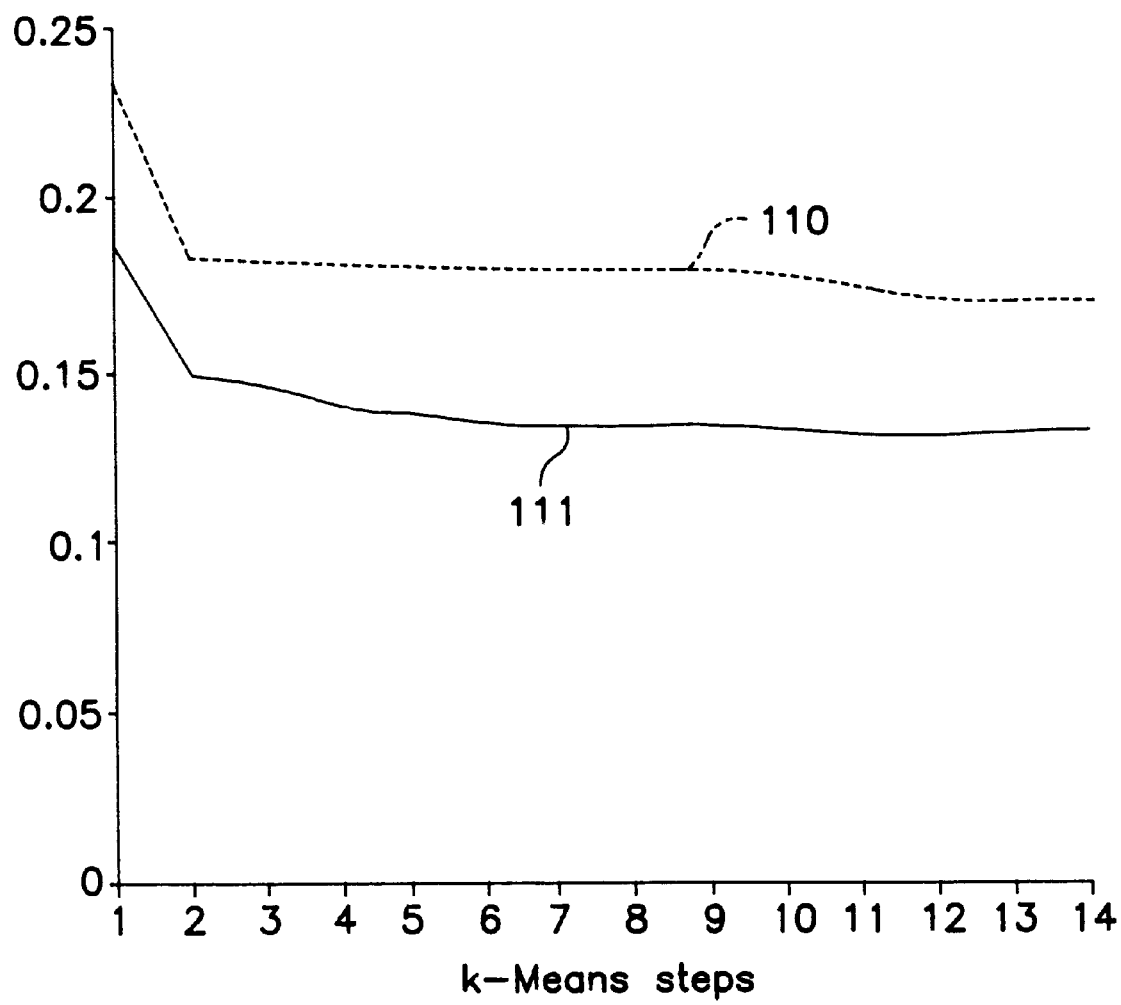
FIG. 11 shows the average least-square errors of the k-means algorithm and a nonlinear cluster-guided tour as a function of the number of iterations (or steps) of the k-means algorithm of the Ionosphere with the number of clusters equal to 5.

FIG. 11 shows the average least-square errors for the k-means algorithm 110 and for a nonlinear cluster-guided tour 111 as a function of the number of iterations (or steps) of the k-means algorithm of the Ionosphere with the number of clusters equal to 5. Both average least-squares errors have been normalized by the dimension p=34.

The cluster-guided tours of the present invention can be enhanced by using similarity graphs, such as disclosed by R. O. Duda et al., Pattern Classification and Scene Analysis, Wiley, 1973. To show this, suppose that the data points $\{X_i\}_{i=1}^n$ are clustered into k clusters. A cluster similarity graph is defined as follows: Let the set of all cluster centroids define vertices of the similarity graph. Add an edge between the cluster centroids $C_a$ and $C_b$ when $$d_2(C_a,C_b) \leq T, \quad (37)$$

where T is a user-controlled threshold parameter. When T is very large, all centroids are connected. On the other hand, when T is very small, no centroids are connected. It is thus intuitively clear that the choice of the threshold parameter is extremely important in revealing similarities (or dissimilarities) between cluster centroids. To obtain "natural" connections between the centroids, T must be greater than typical distances between related clusters, but less than typical distances between unrelated clusters.

According to the invention, a cluster similarity graph is overlaid on the data set while performing a cluster-guided grand tour. Explicitly including a cluster similarity graph as a part of the cluster-guided grand tours provides a constant reminder of the inherent limitation of the display method. That is, just because two points appear close in a 2-dimensional (linear or nonlinear) cluster projection, it does not follow that the points are also close in $R^p$. Furthermore, the edges of the cluster similarity graph serve as a skeleton for the data, and help uncover interesting structures and patterns. The cluster similarity graph adds yet another dimension of information to cluster-guided grand tours-and hence enhances viewing experience.

Conversely, cluster-guided grand tours provide an effective mechanism for visualizing the cluster similarity graph in high-dimensions. A cluster similarity graph is a collection of edges between various multi-dimensional points. Conventional graph drawing techniques operate by embedding graphs in a plane, and then visualizing the embedded graph. For example, see G. D. Battista et al., Algorithms for drawing graphs: an annotated bibliography, Computational Geometry: Theory and Applications, 4(5), pp. 235–282, 1994. When both the underlying dimensionality and the number of cluster centroids are large, conventional techniques fail to provide an intuitive picture of the cluster similarity graph. The present invention completely bypasses these problems by using the concepts of the cluster-guided grand tours.

According to the present invention, it is also possible to overlay a cluster-guided tour with other structures, such as relative neighborhood graphs and Gabriel graphs, and minimum spanning trees.

Figure 12:
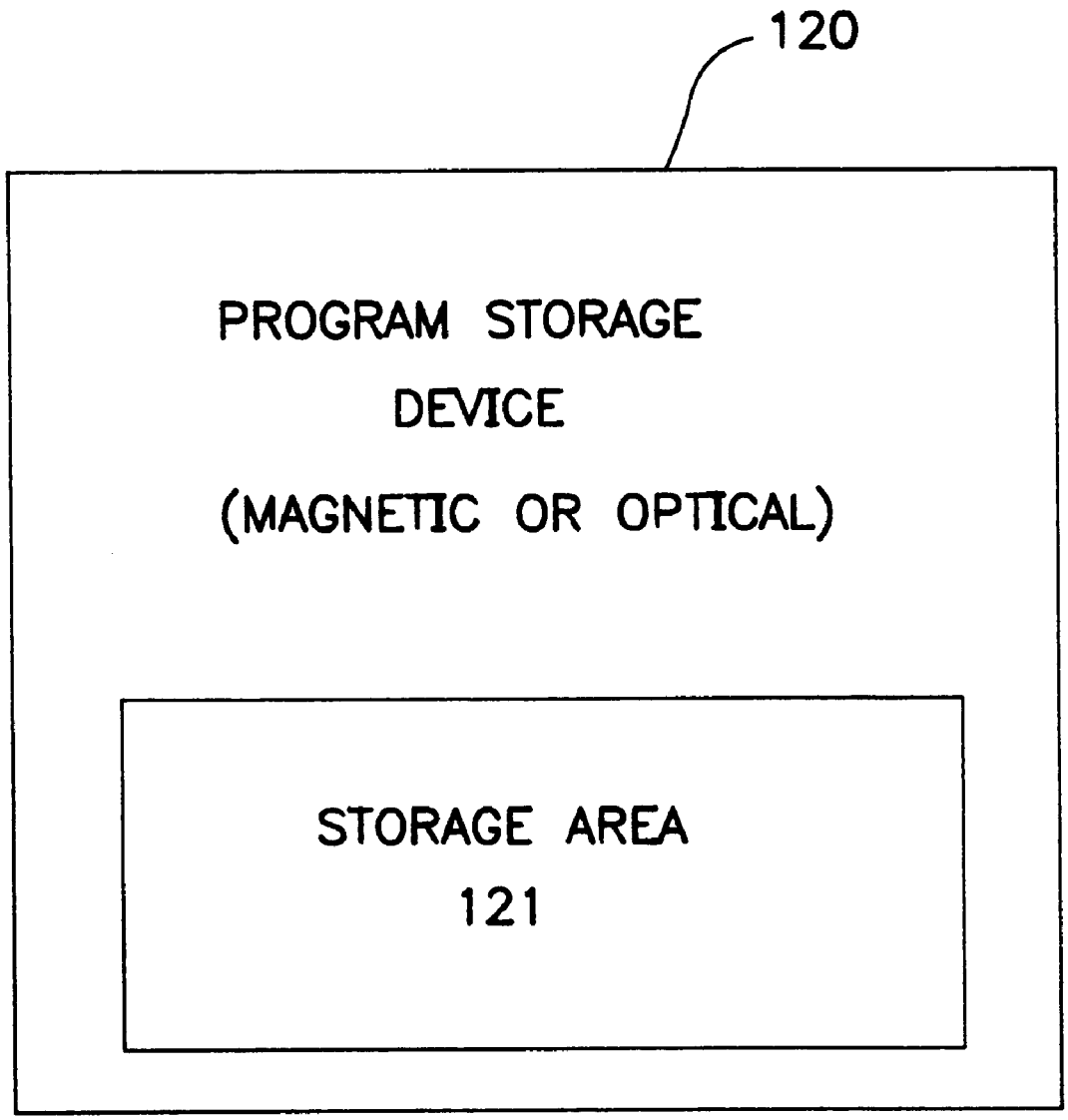
FIG. 12 shows a program storage device having a storage area that stores a program embodying the cluster exploration and visualization technique of the present invention.

FIG. 12 shows a program storage device 120 having a storage area 121. Information stored in the storage area in a well-known manner that is readable by a machine, and that tangibly embodies a program of instructions executable by the machine for performing the method of the present invention described herein for automatically finding subspaces of the highest dimensionality in a data space for data mining applications. Program storage device 120 can be a magnetically recordable medium device, such as a magnetic diskette or hard drive, or an optically recordable medium device, such as an optical disk.

While the present invention has been described in connection with the illustrated embodiments, it will be appreciated and understood that modifications may be made without departing from the true spirit and scope of the invention.

What is claimed is:

1. A method for visualizing a multi-dimensional data set, the method comprising the steps of:
   clustering the multi-dimensional data set into k clusters, each cluster having a centroid;
   selecting one of two distinct current centroids and three distinct non-collinear current centroids;
   generating a current 2-dimensional cluster projection based on the selected current centroids;
   selecting two distinct target centroids when two distinct current centroids are selected, at least one of the two target centroids being different from the two current centroids;
   selecting three distinct non-collinear target centroids when three distinct non-collinear current centroids are selected, at least one of the three target centroids being different from the three current centroids; and
   generating an intermediate 2-dimensional cluster projection based on the current centroids and the target centroids.

2. The method according to claim 1, further comprising the step of associating each current centroid with a target centroid, and
   wherein the step of generating the intermediate 2-dimensional cluster projection is based on a set of interpolated centroids, each interpolated centroid of the set of interpolated centroids corresponding to a current centroid and to the target centroid associated with the current centroid, and each interpolated centroid being interpolated between the corresponding current centroid and the associated target centroid.

3. The method according to claim 2, wherein the set of interpolated centroids varies between the current centroids and the target centroids based on a value of an interpolation parameter.

4. The method according to claim 3, wherein step of generating the intermediate 2-dimensional cluster projection is repeated for different values of the interpolation parameter.

5. The method according to claim 4, wherein the value of the interpolation parameter is monotonically increased when repeatedly generating the intermediate 2-dimensional cluster projection, thereby generating a holistic image of the multi-dimensional data set with respect to the current centroids and the target centroids.

6. The method according to claim 5, further comprising the steps of:
   defining the selected target centroids to be new current centroids;
   selecting two distinct new target centroids when two new current centroids are defined from the selected target centroids, at least one of the two distinct new target centroids being different from the two new current centroids;
   selecting three distinct non-collinear new target centroids when three distinct non-collinear new current centroids are defined from the selected target centroids, at least one of the three distinct non-collinear new target centroids being different from the three distinct non-collinear new current centroids;
   associating each new current centroid with a new target centroid; and
   generating the intermediate 2-dimensional cluster projection based on a set of new interpolated centroids, each interpolated centroid of the new set of interpolated centroids corresponding to a new current centroid and to the new target centroid associated with the new current centroid, and each new interpolated centroid being interpolated between the corresponding new current centroid and t he associated new target centroid.

7. The method according to claim 6, where in the steps of defining new current centroids, selecting new target centroids, associating each new current centroid with a new target centroid, and generating the intermediate 2-dimensional cluster projection are performed repeatedly, thereby generating a holistic image of the multi-dimensional data set with respect to each set of current centroids and the associated target centroids.

8. The method according to claim 7, further comprising the steps of:
   calculating an average least-squares reconstruction error for at least one 2-dimensional cluster projection;
   calculating an average least-squares reconstruction error based on a truncated singular value decomposition of the data set; and
   comparing each average least-square reconstruction error an d the average least-square construction error based on the truncated singular value decomposition of the data set.

9. The method according to claim 8, further comprising the step of displaying the comparison of the average least-square reconstruction error for the 2-dimensional cluster projection and the average least-square construction error based on the truncated singular value decomposition of the data set.

10. The method according to claim 1, where in t he step of generating the intermediate 2-dimensional cluster projection generates an interpolated 2-dimensional nonlinear cluster projection based on the selected current centroids and the selected target centroids.

11. The method according to claim 10, wherein intermediate 2-dimensional cluster projection is further based on a value of an interpolation parameter.

12. The method according to claim 11, wherein step of generating the intermediate 2-dimensional cluster projection is repeated for different values of the interpolation parameter.

13. The method according to claim 12, wherein the value of the interpolation parameter is monotonically increased when repeatedly generating the intermediate 2-dimensional cluster projection, thereby generating a holistic image of the multi-dimensional data set with respect to the current centroids and the target centroids.

14. The method according to claim 13, the step of repeatedly generating the intermediate 2-dimensional cluster projection for different values of the interpolation parameter generates a plurality of 2-dimensional cluster projections that follows a geodesic path between the current centroids and the target centroids.

15. The method according to claim 13, further comprising the steps of:
   defining the selected target centroids to be new current centroids;
   selecting two distinct new target centroids when two new current centroids are defined from the selected target centroids, at least one of the two distinct new target centroids being different from the two new current centroids;
   selecting three distinct non-collinear new target centroids when three distinct non-collinear new current centroids are defined from the selected target centroids, at least one of the three distinct non-collinear new target centroids being different from the three distinct non-collinear new current centroids; and
   generating the intermediate 2-dimensional cluster projection based on the new current centroids and the new target centroids.

16. The method according to claim 15, where in the steps of defining new current centroids, selecting new target centroids and generating the intermediate 2-dimensional cluster projection are performed repeatedly, thereby generating a holistic image of the multi-dimensional data set with respect to each set of current centroids and the target centroids.

17. The method according to claim 16, further comprising the steps of:
   calculating a n average least-squares reconstruction error for at least one 2-dimensional cluster projection;
   calculating an average least-squares reconstruction error based on a truncated singular value decomposition of the data set; and
   comparing each average least-square reconstruction error and the average least-square construction error based on the truncated singular value decomposition of the data set.

18. The method according to claim 17, further comprising the step of displaying the comparison of the average least-square reconstruction error for the 2-dimensional cluster projection and the average least-square construction error based on the truncated singular value decomposition of the data set.

19. The method according to claim 1, further comprising the steps of:
   calculating an average least-squares reconstruction error for a 2-dimensional cluster projection when two distinct current centroids are selected;
   calculating an average least-squares reconstruction error based on a truncated singular value decomposition of the data set; and
   comparing the average least-square reconstruction error for the 2-dimensional cluster projection and the average least-square construction error based on the truncated singular value decomposition of the data set.

20. The method according to claim 19, further comprising the step of displaying the comparison of the average least-square reconstruction error for the 2-dimensional cluster projection and the average least-square construction error based on the truncated singular value decomposition of the data set.

21. A program storage device comprising:
   a storage area; and
   information stored in the storage area, the information being readable by a machine, and tangibly embodying a program of instructions executable by the machine for performing method steps for visualizing a multi-dimensional data set, the method comprising the steps of:
      clustering the multi-dimensional data set into k clusters, each cluster having a centroid;
      selecting one of two distinct current centroids and three distinct non-collinear current centroids;
      generating a current 2-dimensional cluster projection based on the selected current centroids;
      selecting two distinct target centroids when two distinct current centroids are selected, at least one of the two target centroids being different from the two current centroids;
      selecting three distinct non-collinear target centroids when three distinct non-collinear current centroids are selected, at least one of the three target centroids being different from the three current centroids; and
      generating an intermediate 2-dimensional cluster projection based on the current centroids and the target centroids.

22. The program storage device according to claim 21, wherein the method further comprises the step of associating each current centroid with a target centroid, and
   wherein the step of generating the intermediate 2-dimensional cluster projection is based on a set of interpolated centroids, each interpolated centroid of the set of interpolated centroids corresponding to a current centroid and to the target centroid associated with the current centroid, and each interpolated centroid being interpolated between the corresponding current centroid and the associated target centroid.

23. The program storage device according to claim 22, wherein the set of interpolated centroids varies between the current centroids and the target centroids based on a value of an interpolation parameter.

24. The program storage device according to claim 23, wherein step of generating the intermediate 2-dimensional cluster projection is repeated for different values of the interpolation parameter.

25. The program storage device according to claim 24, wherein the value of the interpolation parameter is monotonically increased when repeatedly generating the intermediate 2-dimensional cluster projection, thereby generating a holistic image of the multi-dimensional data set with respect to the current centroids and the target centroids.

26. The program storage device according to claim 25, wherein the method further comprises the steps of:
   defining the selected target centroids to be new current centroids;
   selecting two distinct new target centroids when two new current centroids are defined from the selected target centroids, at least one of the two distinct new target centroids being different from the two new current centroids;
   selecting three distinct non-collinear new target centroids when three distinct non-collinear new current centroids are defined from the selected target centroids, at least one of the three distinct non-collinear new target centroids being different from the three distinct non-collinear new current centroids;

associating each new current centroid with a new target centroid; and generating the intermediate 2-dimensional cluster projection based on a set of new interpolated centroids, each interpolated centroid of the new set of interpolated centroids corresponding to a new current centroid and to the new target centroid associated with the new current centroid, and each new interpolated centroid being interpolated between the corresponding new current centroid and the associated new target centroid.

27. The program storage device according to claim 26, wherein the steps of defining new current centroids, selecting new target centroids, associating each new current centroid with a new target centroid, and generating the intermediate 2-dimensional cluster projection are performed repeatedly, thereby generating a holistic image of the multi-dimensional data set with respect to each set of current centroids and the associated target centroids.

28. The program storage device according to claim 27, wherein the method further comprises the steps of:

calculating an average least-squares reconstruction error for at least one 2-dimensional cluster projection;

calculating an average least-squares reconstruction error based on a truncated singular value decomposition of the data set; and comparing each average least-square reconstruction error and the average least-square construction error based on the truncated singular value decomposition of the data set.

29. The program storage device according to claim 28, wherein the method further comprises the step of displaying the comparison of the average least-square reconstruction error for the 2-dimensional cluster projection and the average least-square construction error based on the truncated singular value decomposition of the data set.

30. The program storage device according to claim 21, the step of generating the intermediate 2-dimensional cluster projection generates an interpolated 2-dimensional nonlinear cluster projection based on the selected current centroids and the selected target centroids.

31. The program storage device according to claim 30, wherein intermediate 2-dimensional cluster projection is further based on a value of an interpolation parameter.

32. The program storage device according to claim 31, wherein step of generating the intermediate 2-dimensional cluster projection is repeated for different values of the interpolation parameter.

33. The program storage device according to claim 32, wherein the value of the interpolation parameter is monotonically increased when repeatedly generating the intermediate 2-dimensional cluster projection, thereby generating a holistic image of the multi-dimensional data set with respect to the current centroids and the target centroids.

34. The program storage device according to claim 33, the step of repeatedly generating the intermediate 2-dimensional cluster projection for different values of the interpolation parameter generates a plurality of 2-dimensional cluster projections that follows a geodesic path between the current centroids and the target centroids.

35. The program storage device according to claim 33, wherein the method further comprises the steps of:

defining the selected target centroids to be new current centroids;

selecting two distinct new target centroids when two new current centroids are defined from the selected target centroids, at least one of the two distinct new target centroids being different from the two new current centroids;

selecting three distinct non-collinear new target centroids when three distinct non-collinear new current centroids are defined from the selected target centroids, at least one of the three distinct non-collinear new target centroids being different from the three distinct non-collinear new current centroids; and generating the intermediate 2-dimensional cluster projection based on the new current centroids and the new target centroids.

36. The program storage device according to claim 35, wherein the steps of defining new current centroids, selecting new target centroids and generating the intermediate 2-dimensional cluster projection are performed repeatedly, thereby generating a holistic image of the multi-dimensional data set with respect to each set of current centroids and the target centroids.

37. The program storage device according to claim 36, wherein the method further comprises the steps of:

calculating an average least-squares reconstruction error for at least one 2-dimensional cluster projection;

calculating an average least-squares reconstruction error based on a truncated singular value decomposition of the data set; and comparing each average least-square reconstruction error and the average least-square construction error based on the truncated singular value decomposition of the data set.

38. The program storage device according to claim 37, wherein the method further comprises the step of displaying the comparison of the average least-square reconstruction error for the 2-dimensional cluster projection and the average least-square construction error based on the truncated singular value decomposition of the data set.

39. The program storage device according to claim 21, wherein the method further comprises the steps of:

calculating an average least-squares reconstruction error for a 2-dimensional cluster projection when two distinct current centroids are selected;

calculating an average least-squares reconstruction error based on a truncated singular value decomposition of the data set; and comparing the average least-square reconstruction error for the 2-dimensional cluster projection and the average least-square construction error based on the truncated singular value decomposition of the data set.

40. The program storage device according to claim 39, the method further comprises the step of displaying the comparison of the average least-square reconstruction error for the 2-dimensional cluster projection and the average least-square construction error based on the truncated singular value decomposition of the data set.

* * * * *

UNITED STATES PATENT AND TRADEMARK OFFICE
CERTIFICATE OF CORRECTION

PATENT NO. : 6,100,901

DATED : August 8, 2000

INVENTOR(S) : Dharmendra Shantilal Modha, et al.

It is certified that error appears in the above-identified patent and that said Letters Patent is hereby corrected as shown below:

On the Cover Page, in the Inventor's data, first inventor:

"Mohda" has been replaced with --Modha--.

In Claim 6, column 16, line 30:

"t he" has been replaced with --the--.

In Claim 8, column 16, line 47:

"an d" has been replaced with --and--.

In Claim 10, column 16, line 56:

"where in t he" has been replaced with --wherein the--.

UNITED STATES PATENT AND TRADEMARK OFFICE
CERTIFICATE OF CORRECTION

PATENT NO. : 6,100,901

DATED : August 8, 2000

INVENTOR(S) : Dharmendra Shantilal Modha, et al.

It is certified that error appears in the above-identified patent and that said Letters Patent is hereby corrected as shown below:

In Claim 17, column 17, line 41:

"a n" has been replaced with --an--.

Signed and Sealed this

Twenty-ninth Day of May, 2001

*Attest:*

NICHOLAS P. GODICI

*Attesting Officer*   *Acting Director of the United States Patent and Trademark Office*